(12) United States Patent
Lee et al.

(10) Patent No.: US 12,551,087 B2
(45) Date of Patent: Feb. 17, 2026

(54) DISHWASHER

(71) Applicant: LG Electronics Inc., Seoul (KR)

(72) Inventors: Dongho Lee, Seoul (KR); Jongyoung Kim, Seoul (KR)

(73) Assignee: LG Electronics Inc., Seoul (KR)

(*) Notice: Subject to any disclaimer, the term of this patent is extended or adjusted under 35 U.S.C. 154(b) by 721 days.

(21) Appl. No.: 17/991,164

(22) Filed: Nov. 21, 2022

(65) Prior Publication Data
US 2023/0210342 A1 Jul. 6, 2023

(30) Foreign Application Priority Data

Dec. 31, 2021 (KR) ........................ 10-2021-0194344

(51) Int. Cl.
A47L 15/48 (2006.01)
B01D 46/00 (2022.01)
B01D 46/24 (2006.01)

(52) U.S. Cl.
CPC ........... A47L 15/488 (2013.01); A47L 15/486 (2013.01); B01D 46/0005 (2013.01); B01D 46/0049 (2013.01); B01D 46/2403 (2013.01); B01D 2273/30 (2013.01); B01D 2279/55 (2013.01)

(58) Field of Classification Search
CPC . A47L 15/488; A47L 15/486; B01D 46/0005; B01D 46/2403
USPC ........ 134/102.1, 102.2, 25.3, 151, 157, 198, 134/33, 34
See application file for complete search history.

(56) References Cited

U.S. PATENT DOCUMENTS

| 5,524,358 A | 6/1996 | Matz |
| 2011/0126864 A1* | 6/2011 | Kim ...................... A47L 15/483 |
| | | 134/115 R |

FOREIGN PATENT DOCUMENTS

| CN | 107970018 A | 5/2018 | |
| CN | 113080800 A | 7/2021 | |
| DE | 102006012282 | 6/2007 | |
| JP | 2002 301000 A | 10/2002 | |
| JP | 2004229770 A * | 8/2004 | ............ A47L 15/42 |
| KR | 20190105887 | 9/2019 | |

OTHER PUBLICATIONS

English translation of JP2004229770 by PE2E Aug. 8, 2025.*
EP Extended European Search Report in European Appln. No. 22214185.5, mailed on May 30, 2023, 7 pages.

* cited by examiner

Primary Examiner — Deming Wan
(74) Attorney, Agent, or Firm — Fish & Richardson P.C.

(57) ABSTRACT

A dishwasher includes a filter member that is inserted through the lower surface of a tub at a time of replacing the filter member and is applicable regardless of the type of a dishwasher, thereby reducing manufacturing costs and enhancing user convenience. The cylinder-shaped filter member is accommodated entirely in a filter housing, and external air flows into the filter member through the upper end and the lower end of the filter member respectively and then passes through the outer circumferential surface of the filter member, to be filtered, thereby preventing the filter member from being blocked partially and ensuring a sufficient flow rate of air.

20 Claims, 19 Drawing Sheets

DISHWASHER

CROSS-REFERENCE TO RELATED APPLICATION

This application claims priority to and the benefit of Korean Patent Application No. 10-2021-0194344, filed on Dec. 31, 2021, the disclosure of which is incorporated herein by reference in its entirety.

TECHNICAL FIELD

Disclosed herein is a dishwasher, and in particular, a dishwasher in which a filter member is inserted through the lower surface of a tub at a time of replacing the filter member and is applicable regardless of the type of a dishwasher, thereby reducing manufacturing costs and enhancing user convenience, and in which the cylinder-shaped filter member is accommodated entirely in a filter housing, and external air flows into the filter member through the upper end and the lower end of the filter member respectively and then passes through the outer circumferential surface of the filter member, to be filtered, thereby preventing the filter member from being blocked partially and ensuring a sufficient flow rate of air.

BACKGROUND

Dishwashers spray wash water such as water to a wash target such as cooking vessels, cooking tools and the like accommodated in them to wash the wash target. At this time, wash water used for washing a wash target may include detergent.

Ordinarily, dishwashers are comprised of a wash tub forming a wash space, a storage part accommodating wash targets in the wash tub, a spray arm spraying wash water to the storage part, and a sump storing water and supplying wash water to the spray arm.

Dishwashers help to reduce time and efforts taken to clean wash targets such as cooking vessels and the like after meals, thereby ensuring improvement in user convenience.

Ordinarily, dishwashers perform a washing process of washing wash targets, a rinsing process of rinsing the wash targets, and a drying process of drying the wash targets after the washing and rinsing processes.

In recent years, the drying stage of dishwashers involves supplying high-temperature dry air into the wash tub to reduce a drying period and promote the effect of sterilizing wash targets.

As a related art, a dishwasher provided with a hot air supply device that generates and supplies high-temperature dry air after the washing and rinsing stages is disclosed in U.S. Pat. No. 5,524,358 (prior art document 001).

In the dishwasher according to prior art document 001, an intake opening into which external air is suctioned, and a filter are disposed at a baseboard side formed on the front surface of the lower portion of a door or a lateral surface side of the dishwasher to filter impurities or dusts and the like included in the external air and supply the filtered air into the tub.

However, in relation to the hot air supply device according to prior art document 001, since the intake opening and the filter are disposed at the front surface side or a lateral surface side of the dishwasher, the hot air supply device can hardly be applied to a dishwasher having a baseboard that is entirely blocked or to a dishwasher built into kitchen furniture. That is, in design, the positions of the intake opening and the filter vary depending on the type of a dishwasher, causing an increase in the costs of designing and manufacturing a product.

Additionally, technologies have been developed for dishwashers in which a filter is withdrawn and inserted through the bottom surface or the lower surface of a tub such that the filter can be disposed and replaced regardless of the type of a product.

A portion of the filter member of the hot air supply device provided for the dishwasher is disposed in a filter housing, and the remaining portion is exposed to the outside of the filter housing. Since external air is drawn only through and filtered only by the portion of the outer circumferential surface of the filter member, exposed to the outside of the filter housing, the filter member is highly likely to be partially blocked. Thus, filtering efficiency of the filter member can deteriorate rapidly within a short period of time.

Further, in the hot air supply device provided in the dishwasher, external air is filtered while passing through the outer circumferential surface of the cylinder-shaped filter member, and then discharged only through an open lower end of the filter member, to flow into a fan. Accordingly, unless the lower end of the filter member has an enough cross-sectional area, a supply rate may be much less than a flow rate of air required in the drying stage, causing an increasing in the drying period and power consumption.

Furthermore, in the hot air supply device provided in the dishwasher, the bottom surface of the filter housing accommodating the filter member and the fan is open outward at least partially, and is supported in the state of being spaced from a base. Accordingly, non-filtered external air is highly likely to be drawn through the partially open bottom surface of the filter housing, and in the drying stage, highly likely to be supplied into the tub, causing fixation of dust and the like in a wash target and contamination of the wash target.

PRIOR ART DOCUMENT

Patent Document (Document 001) U.S. Pat. No. 5,524,358

SUMMARY

Technical Problems

The first objective of the present disclosure is to provide a dishwasher in which a filter member is inserted through the lower surface of a tub at a time of replacing the filter member and is applicable regardless of the type of a dishwasher, thereby enhancing user convenience, and in which the cylinder-shaped filter member is accommodated entirely in a filter housing, and external air flows into the filter member through the upper end and the lower end of the filter member respectively and then passes through the outer circumferential surface of the filter member, to be filtered, thereby preventing the filter member from being blocked partially and ensuring a sufficient flow rate of air.

The second objective of the present disclosure is to provide a dishwasher in which external air is drawn only through an upper suction opening and a lower suction opening that are respectively formed at the upper side and the lower side of a filter member and spaced from each other, the filter member is supported in a filter housing, in surface-contact with the filter housing, thereby minimizing the inflow of non-filtered external air to a fan and significantly enhancing filtering efficiency.

The third objective of the present disclosure is to provide a dishwasher in which wash water having leaked from a tub to a filter housing is prevented from flowing into an air blowing fan side, thereby significantly reducing the possibility of damage to components, caused by leakage of water.

Aspects according to the present disclosure are not limited to the above ones, and other aspects and advantages that are not mentioned above can be clearly understood from the following description and can be more clearly understood from the embodiments set forth herein. Additionally, the aspects and advantages in the present disclosure can be realized via means and combinations thereof that are described in the appended claims.

Technical Solutions

A dishwasher according to the present disclosure comprises: a tub accommodating a wash target and having a wash space a front surface of which is open; a dry air supply part being disposed under the tub and generating dry airflow for drying the wash target and supplying the dry airflow into the tub; and a base on which the tub is mounted, the dry air supply part, comprising: a fan housing accommodating an air blowing fan that generates the dry airflow; and a filtering part accommodating the fan housing and a filter member that filters air to be suctioned into the fan housing, wherein the filtering part is provided with a plurality of suction openings that are open toward a space between the base and the tub and are spaced from each other in an up-down direction.

The filtering part may comprise a filter housing that comprises a fan housing accommodation space in which the fan housing is disposed and a filter accommodation space in which the filter member is disposed, the plurality of suction openings may comprise: an upper suction opening being formed at an upper side of the filter accommodation space; and a lower suction opening being formed at a lower side of the filter accommodation space, a bottom surface of the filter housing may be spaced from a lower surface of the base, and the lower suction opening may be formed on the bottom surface of the filter housing.

The filter member may have a cylinder shape, and have an upper opening into which air having passed through the upper suction opening flows, on an upper surface thereof, and a lower opening into which air having passed through the lower suction opening flows, on a lower surface thereof.

The upper opening may be open toward a lower surface of the tub, and the lower opening may be open toward the lower surface of the base.

Additionally, air having flown respectively through the upper opening and the lower opening may be drawn to an inner circumferential surface of the filter member and then filtered, and pass through an outer circumferential surface of the filter member and be discharged.

The fan housing may be fixed to the fan housing accommodation space in a state of being spaced from the bottom surface of the filter housing, an intake opening of the fan housing may be open toward an inner surface of the filter housing, and air having passed through the outer circumferential surface of the filter member may be suctioned through the intake opening of the fan housing.

The upper suction opening may be formed in a position higher than the upper opening of the filter member in the up-down direction, and the lower suction opening may be formed in a position lower than the lower opening of the filter member in the up-down direction.

Further, an open surface area of the lower suction opening may be less than an open surface area of the lower opening of the filter member.

The lower suction opening may be a circular opening having a diameter less than an inner diameter of the lower opening.

In a state in which the filter member is disposed in the filter accommodation space, the lower suction opening, when viewed from the lower surface of the base, may be in an area of the lower opening of the filter member.

The lower surface of the filter member may contact the bottom surface of the filter housing.

Further, a first rib may be provided on the bottom surface of the filter housing, extend along a circumference of the lower suction opening and protrude upward, and in the state in which the filter member is disposed in the filter accommodation space, the first rib may pass through the lower opening of the filter housing at least partially and be inserted into the filter housing.

The first rib may contact an inner circumferential surface of the filter member.

Further, a second rib may be provided on the bottom surface of the filter housing, extend along a circumference of the first rib, outside the first rib, in a radial direction of the first rib, and protrude upward, and in the state in which the filter member is disposed in the filter accommodation space, the second rib may contact the outer circumferential surface of the filter member.

The upper suction opening may be formed between the tub and the upper surface of the filter member in the up-down direction.

The filter housing may comprise a tub connection duct which forms an upper portion of the filter accommodation space, and an upper end of which passes through a filter replacement hole formed on a lower surface of the tub and protrudes upward, and the upper suction opening may penetrate the tub connection duct and be open horizontally.

The upper suction opening may comprise a plurality of penetration openings that are arranged along a circumferential direction of the tub connection duct.

Further, a protruding surface may be provided on an inner surface of the filter housing, be provided at a lower side of the upper suction opening in the up-down direction and be convex toward the filter accommodation space.

The protruding surface may be continuously formed along a circumferential direction of an outer circumferential surface of the filter member, and in the state in which the filter member is disposed in the filter accommodation space, the protruding surface may contact the outer circumferential surface of the filter member.

Furthermore, an inner circumferential surface of the protruding surface may be a cylindrical surface that contacts the outer circumferential surface of the filter member.

Advantageous Effects

In a dishwasher according to the present disclosure, a filter member may be inserted through the lower surface of a tub at a time of replacing the filter member, applied regardless of the type of a dishwasher, and enhance user convenience.

In the dishwasher, external air may be drawn into the filter member through at least two suction openings and ensure a sufficient flow rate.

In the dishwasher, external air may be drawn only through an upper suction opening and a lower suction opening, and the filter member may be supported in a filter housing, in surface-contact with the filter housing, to ensure significant improvement in filtering efficiency.

In the dishwasher, leaking wash water may be prevented from flowing into electronic components such as an air blowing fan, an air blowing motor and the like in the filter housing, to prevent damage to the electronic components.

In the dishwasher, a means of guiding the movement of the filter member may be provided in the filter housing, to ensure user convenience at a time of inserting the filter member and prevent deterioration in filtering efficiency of the filter member.

Specific effects are described along with the above-described effects in the section of detailed description.

BRIEF DESCRIPTION OF DRAWINGS

The accompanying drawings constitute a part of the specification, illustrate one or more embodiments in the disclosure, and together with the specification, explain the disclosure, wherein.

DETAILED DESCRIPTION

Figure 1:
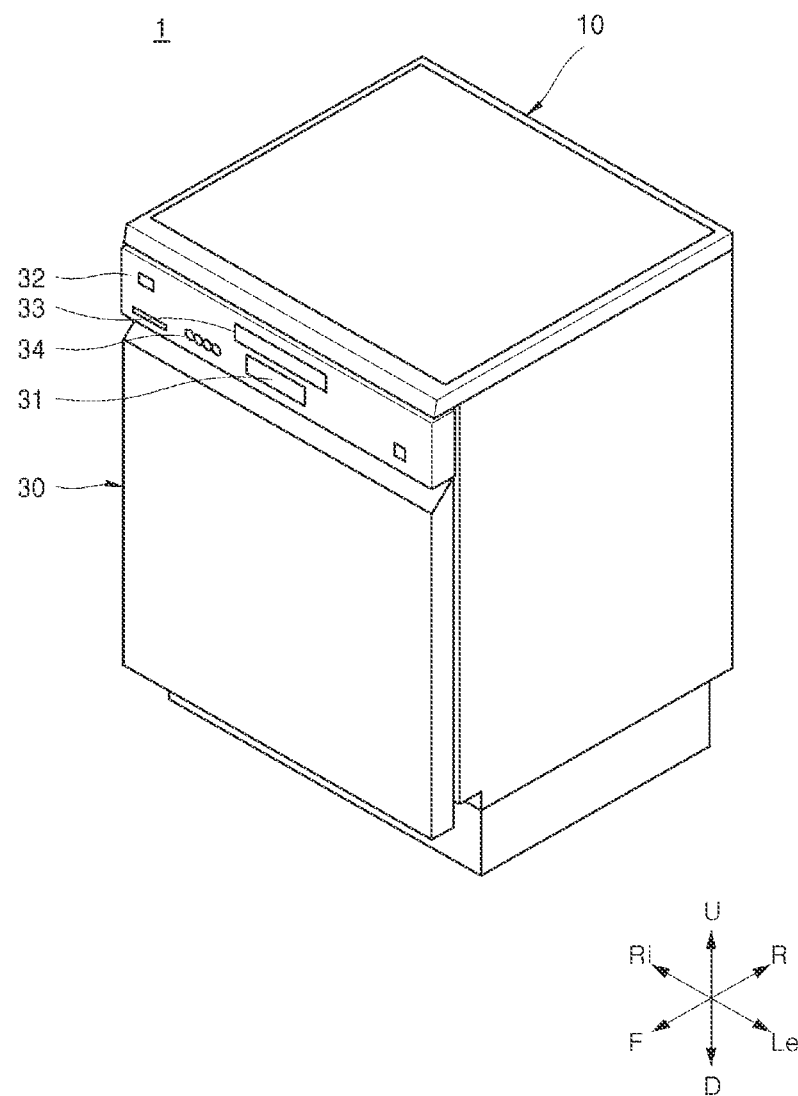
FIG. 1 is front perspective view showing a dishwasher of one embodiment.

The above-described aspects, features and advantages are specifically described hereafter with reference to the accompanying drawings such that one having ordinary skill in the art to which the present disclosure pertains can embody the technical spirit of the disclosure easily. In the disclosure, detailed description of known technologies in relation to the disclosure is omitted if it is deemed to make the gist of the disclosure unnecessarily vague. Below, preferred embodiments according to the disclosure are specifically described with reference to accompanying drawings. In the drawings, identical reference numerals can denote identical or similar components.

The terms "first", "second" and the like are used herein only to distinguish one component from another component. Thus, the components should not be limited by the terms. Certainly, a first component can be a second component, unless stated to the contrary.

Throughout the disclosure, each component can be provided as a single one or a plurality of ones, unless explicitly stated to the contrary.

When one component is described as being "in the upper portion (or lower portion)" or "on (or under)" another component, one component can be directly on (or under) another component, and an additional component can be interposed between the two components.

When any one component is described as being "connected", "coupled", or "connected" to another component, any one component can be directly connected or coupled to another component, but an additional component can be "interposed" between the two components or the two components can be "connected", "coupled", or "connected" by an additional component.

The singular forms "a", "an" and "the" are intended to include the plural forms as well, unless explicitly indicated otherwise. It should be further understood that the terms "comprise" or "include" and the like, set forth herein, are not interpreted as necessarily including all the stated components or steps but can be interpreted as excluding some of the stated components or steps or can be interpreted as including additional components or steps.

The singular forms "a", "an" and "the" are intended to include the plural forms as well, unless explicitly indicated otherwise. It should be further understood that the terms "comprise" or "include" and the like, set forth herein, are not interpreted as necessarily including all the stated components or steps but can be interpreted as excluding some of the stated components or steps or can be interpreted as including additional components or steps.

Throughout the disclosure, the terms "A and/or B" as used herein can denote A, B or A and B, and the terms "C to D" can denote C or greater and D or less, unless stated to the contrary.

Hereafter, the subject matter of the present disclosure is described with reference to the drawings showing the configuration of the dishwasher 1 of the embodiment.

[Entire Structure of Dishwasher]

Hereafter, the entire structure of the dishwasher of one embodiment is describer with reference to the accompanying drawings.

Figure 2:
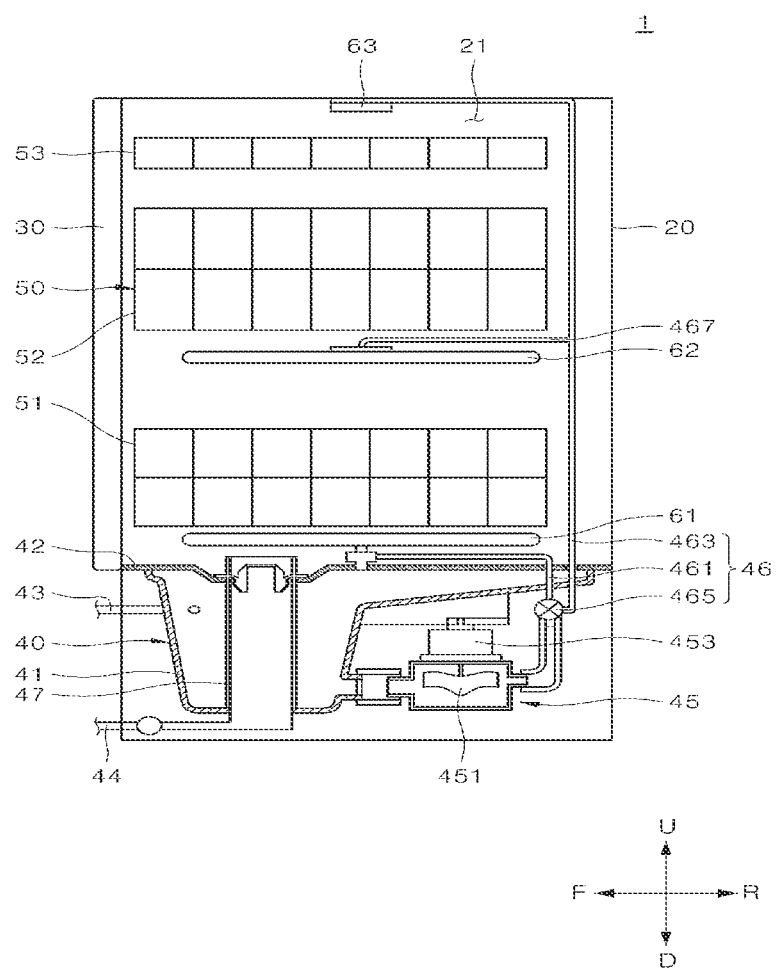
FIG. 2 is a schematic cross-sectional view showing the dishwasher in FIG. 1.

FIG. 1 is a front perspective view showing a dishwasher according to the present disclosure, and FIG. 2 is a schematic cross-sectional view schematically showing the inner structure of the dishwasher according to the present disclosure.

As illustrated in FIG. 1 to 2, the dishwasher 1 according to the present disclosure comprises a case 10 forming the exterior of the dishwasher 1, a tub 20 being installed in the case 10, forming a wash space 21 in which a wash target is washed and having a front surface that is open, a door 30 opening and closing the open front surface of the tub 20, a driving part 40 being disposed under the tub 20 and supplying, collecting, circulating and draining wash water for washing a wash target, a storage part 50 being provided detachably in the wash space 21 in the tub 20 and allowing a wash target to be mounted on, and a spray part 60 being installed near the storage part 50 and spraying wash water for washing a wash target.

At this time, wash targets mounted in the storage part 50 may be cooking vessels such as bowls, dishes, spoons, chopsticks, and the like, and other cooking tools, for example. Hereafter, the wash targets are referred to as cooking vessels, unless mentioned otherwise.

The tub 20 may be formed into a box the front surface of which is open entirely, and may be a so-called wash tub.

The tub 20 may have a wash space 21 therein, and its open front surface may be opened and closed by the door 30.

The tub 20 may be formed in a way that a metallic sheet having strong resistance against high-temperature and moisture, e.g., a stainless steel-based sheet, is pressed.

Additionally, a plurality of brackets may be disposed on the inner surfaces of the tub 20 and allow functional components such as a storage part 50, a spray part 60 and the like, which are described below, to be supported and installed in the tub 20.

The driving part 40 may comprise a sump 41 storing wash water, a sump cover 42 distinguishing the sump 41 from the tub 20, a water supply part 43 supplying wash water to the sump 41 from the outside, a drain part 44 discharging wash water of the sump 41 to the outside, and a water supply pump 45 and a supply channel 46 for supplying wash water of the sump 41 to the spray part 60.

The sump cover 42 may be disposed at the upper side of the sump 41, and distinguish the sump 41 from the tub 20. Additionally, the sump cover 42 may be provided with a plurality of return holes for returning wash water, having sprayed to the wash space 21 through the spray part 60, to the sump 41.

That is, wash water having sprayed toward cooking vessels from the spray part 60 may fall to the lower portion of the wash space 21 and return to the sump 41 through the sump cover 42.

The water supply pump 45 is provided in a lateral portion or the lower portion of the sump 41, and pressurizes wash water and supplies the same to the spray part 60.

One end of the water supply pump 45 may connect to the sump 41, and the other end may connect to the supply channel 46. The water supply pump 45 may be provided with an impeller 451, a motor 453 and the like. As power is supplied to the motor 453, the impeller 451 may rotate, and wash water of the sump 41 may be pressurized and then supplied to the spray part 60 through the supply channel 46.

The supply channel 46 may selectively supply the wash water supplied by the water supply pump 45 to the spray part 60.

For example, the supply channel 46 may comprise a first supply channel 461 connecting to a lower spray arm 61, and a second supply channel 463 connecting to an upper spray arm 62 and a top nozzle 63. The supply channel 46 may be provided with a supply channel diverting valve 465 selectively opening and closing the supply channels 461, 463.

At this time, the supply channel diverting valve 465 may be controlled to allow each of the supply channels 461, 463 to be opened consecutively or opened simultaneously.

The spray part 60 is provided to spray wash water to cooking vessels and the like stored in the storage part 50.

Specifically, the spray part 60 may comprise a lower spray arm 61 being disposed under the tub 20 and spraying wash water to a lower rack 51, an upper spray arm 62 being disposed between the lower rack 51 and an upper rack 52 and spraying wash water to the lower rack 51 and the upper rack 52, and a top nozzle 63 being disposed in the upper portion of the tub 20 and spraying wash water to a top rack 53 or the upper rack 52.

In particular, the lower spray arm 61 and the upper spray arm 62 may be rotatably provided in the wash space 21 of the tub 20, and spray wash water toward cooking vessels in the storage part 50 while rotating.

The lower spray arm 61 may be rotatably supported at the upper side of the sump cover 42 such that the lower spray arm 61 may spray wash water to the lower rack 51 while rotating under the lower rack 51.

Additionally, the upper spray arm 62 may be rotatably supported by a spray arm holder 467 such that the upper spray arm 62 may spray wash water while rotating between the lower rack 51 and the upper rack 52.

The tub 20 may be further provided with a means on a lower surface 25 thereof, to enhance washing efficiency, and the means diverts the direction of wash water having sprayed from the lower spray arm 61 to an upward direction (U-direction).

Since a well-known configuration can be applied to the configuration of the spray part 60, detailed description of the configuration of the spray part 60 is omitted hereafter.

The storage part 50 for storing cooking vessels may be provided in the wash space 21.

The storage part 50 may be withdrawn through the open front surface of the tub 20 from the inside of the tub 20.

For example, FIG. 2 shows an embodiment provided with a storage part comprising a lower rack 51 that is disposed in the lower portion of the tub 20 and stores relatively large-sized cooking vessels, an upper rack 52 that is disposed at the upper side of the lower rack 51 and stores medium-sized cooking vessels, and a top rack 53 that is disposed in the upper portion of the tub 20 and stores small-sized cooking vessels and the like. However, the subject matter of the present disclosure is not limited to the embodiment. Hereafter, a dishwasher that is provided with three storage parts 50, as illustrated, is described.

Each of the lower rack 51, the upper rack 52 and the top rack 53 may be withdrawn outward through the open front surface of the tub 20.

To this end, the tub 20 may have a guide rail, on both lateral walls thereof that form the inner circumferential surface of the tub 20, and for example, the guide rail may comprise an upper rail, a lower rail, a top rail and the like.

Each of the lower rack 51, the upper rack 52 and the top rack 53 may be provided thereunder with wheels. A user may withdraw the lower rack 51, the upper rack 52 and the top rack 53 outward through the front surface of the tub 20 to easily store cooking vessels on the racks or take out cooking vessels from the racks after a washing process.

The guide rail 54 may be provided as a fixed guide rail that guides the withdrawal and insertion of the spray part 60 in the form of a simple rail or as a stretchable guide rail which guides the withdrawal and storage of the spray part 60 and the withdrawal distance of which increases as the spray part 60 is withdrawn.

The door 30 is used for opening and closing the open front surface of the tub 20 that is described above.

Ordinarily, a hinge part for opening and closing the door 30 is provided in the lower portion of the open front surface, and the door 30 is open while rotating around the hinge part as a rotation axis.

The door 30 may be provided with a handle 31 and a control panel 32 on the outer surface thereof. The handle 31 is used for opening the door 30, and the control panel 32 is used for controlling the dishwasher 1.

As illustrated, the control panel 32 may be provided with a display 33 that visually displays information on a current operation state and the like of the dishwasher, and a button part 34 comprising a selection button to which the user's selection manipulation is input, a power button to which the user's manipulation for turning on-off the power source of the dishwasher is input, and the like.

The inner surface of the door 30 may form a mounting surface that supports the lower rack 51 of the storage part 50 as the door 30 is fully opened as well as forming one surface of the tub 20 as the door 30 is closed.

To this end, as the door 30 is fully opened, the inner surface of the door 30 forms a horizontal surface in the same direction where the guide rail 54, by which the lower rack 51 is guided, extends, for example.

In some implementations, a dry air supply part may be provided under the tub 20 and generate high-temperature dry air and supply the same into the tub 20 as described hereafter. The tub 20 may be provided with at least one of dry air supply holes, on the lower surface thereof, and high-temperature dry air generated in the dry air supply part may flow into the tub 20 through the dry air supply hole.

[Detailed Configuration of Dry Air Supply Part]

Hereafter, the detained configuration of the above-described dry air supply part 80 is described with reference to FIGS. 3 to 8.

Figure 3:
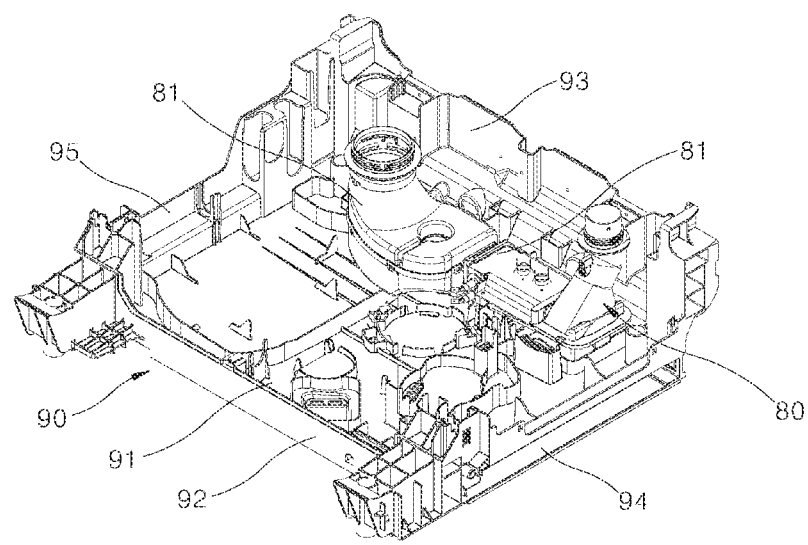
FIG. 3 is a front perspective view showing a dry air supply part of the dishwasher of one embodiment, which is accommodated in a base.
Figure 3:
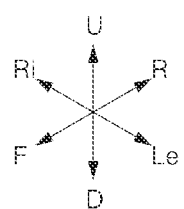

As illustrated in FIG. 3, the dry air supply part 80 may be accommodated in a base 90 and may be disposed to be supported by a lower surface 91 of the base 90.

For example, the dry air supply part 80 may be disposed in a position adjacent to a rear surface 93 of the base 90, and disposed in a position between a leakage detecting part and the rear surface 93 of the base 90, approximately in parallel with the rear surface 93 of the base 90.

The position in which the dry air supply part is disposed may be selected considering the characteristics of the dry air supply part 80 that generates heat of about 100° C. or greater in a high-temperature dry air supply mode. That is, the dry air supply part may be disposed to avoid electronic components that are greatly affected by high-temperature heat.

Additionally, the arrangement position of the dry air supply part may be selected based on the position of the dry air supply hole 254 formed on the lower surface 25 of the tub 20. That is, considering the user's safety, the dry air supply hole 254 into which dry air flows may be formed at the corner of the lower surface 25 of the tub 20, which is adjacent to the rear surface and the left side surface of the tub 20.

For the dry air supply part 80 to effectively generate dry air and supply the same to the dry air supply hole 254 formed in the above-described position, the dry air supply part 80 may be disposed at the lower side of the dry air supply hole 254.

The arrangement position of the dry air supply part 80 is described exemplarily. The dry air supply part 80 may be disposed near a left side surface 94, a right side surface 95 or a front surface 92 of the base 90 rather than the rear surface 93 of the base 90. Hereafter, the dry air supply part 80 disposed near the rear surface 93 of the base 90 approximately in parallel with the rear surface 93 is described, but the position of the dry air supply part 80 is not limited.

Figure 4:
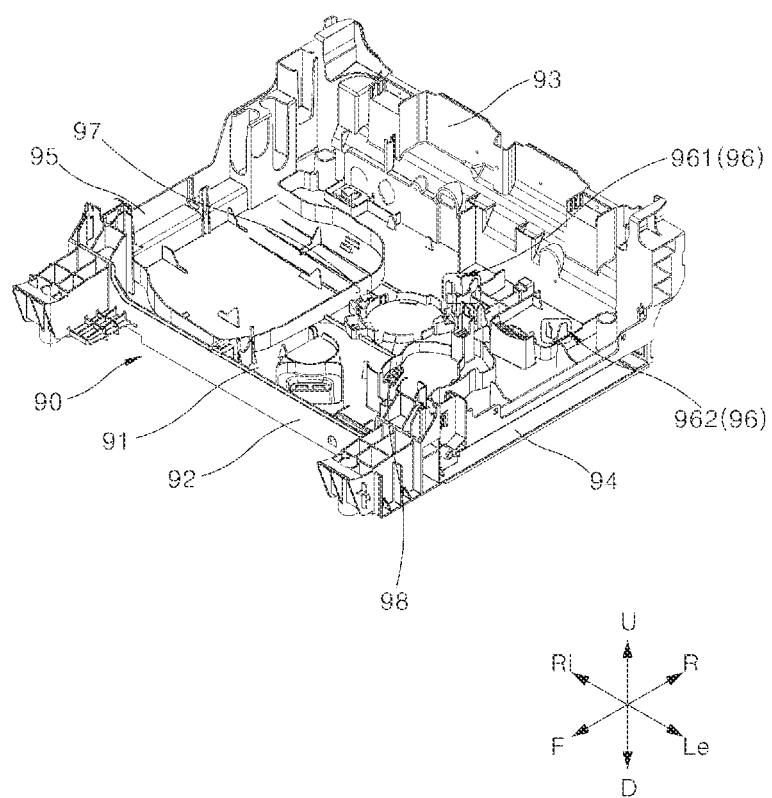
FIG. 4 is a front perspective view showing FIG. 3 without the dry air supply part.
Figure 5:
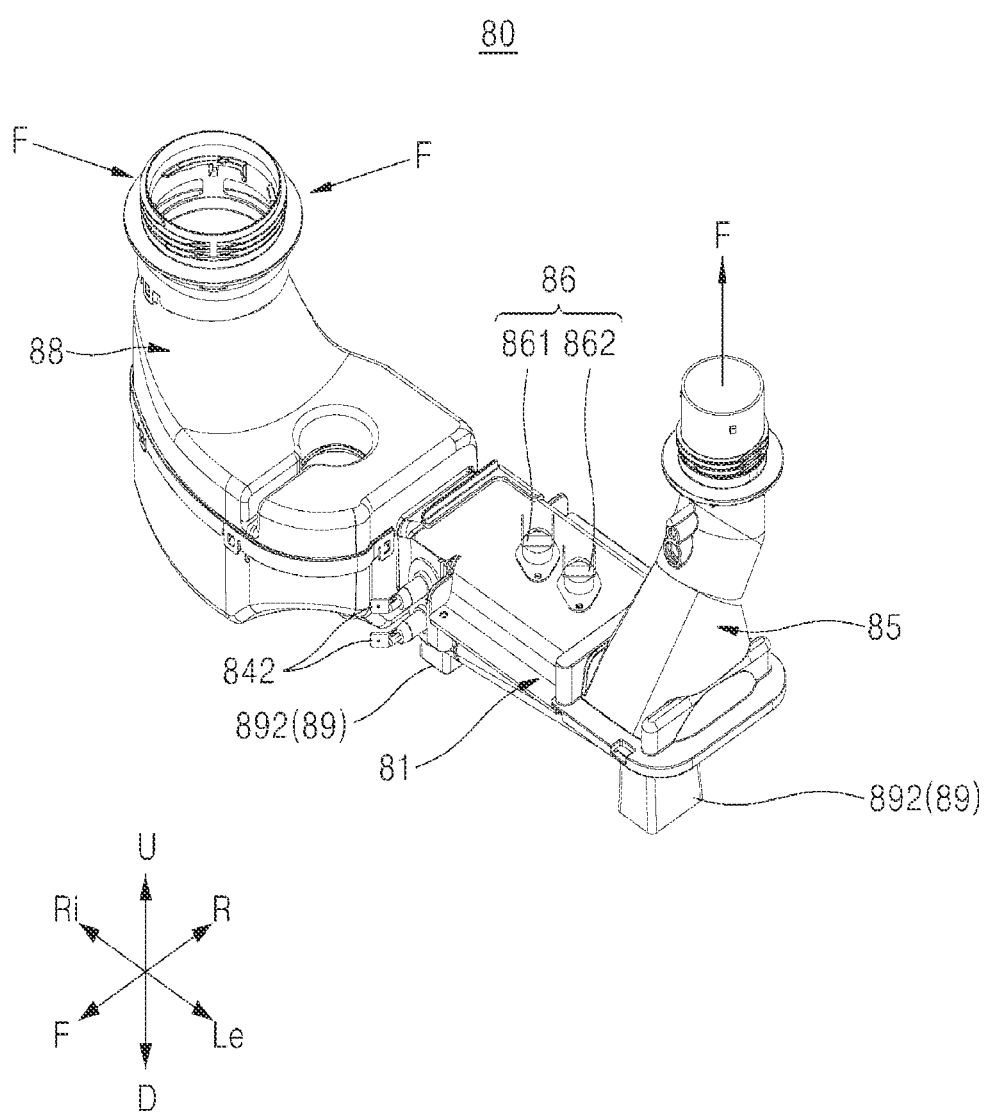
FIG. 5 is a front perspective view showing the dry air supply part in FIG. 3.
Figure 6:
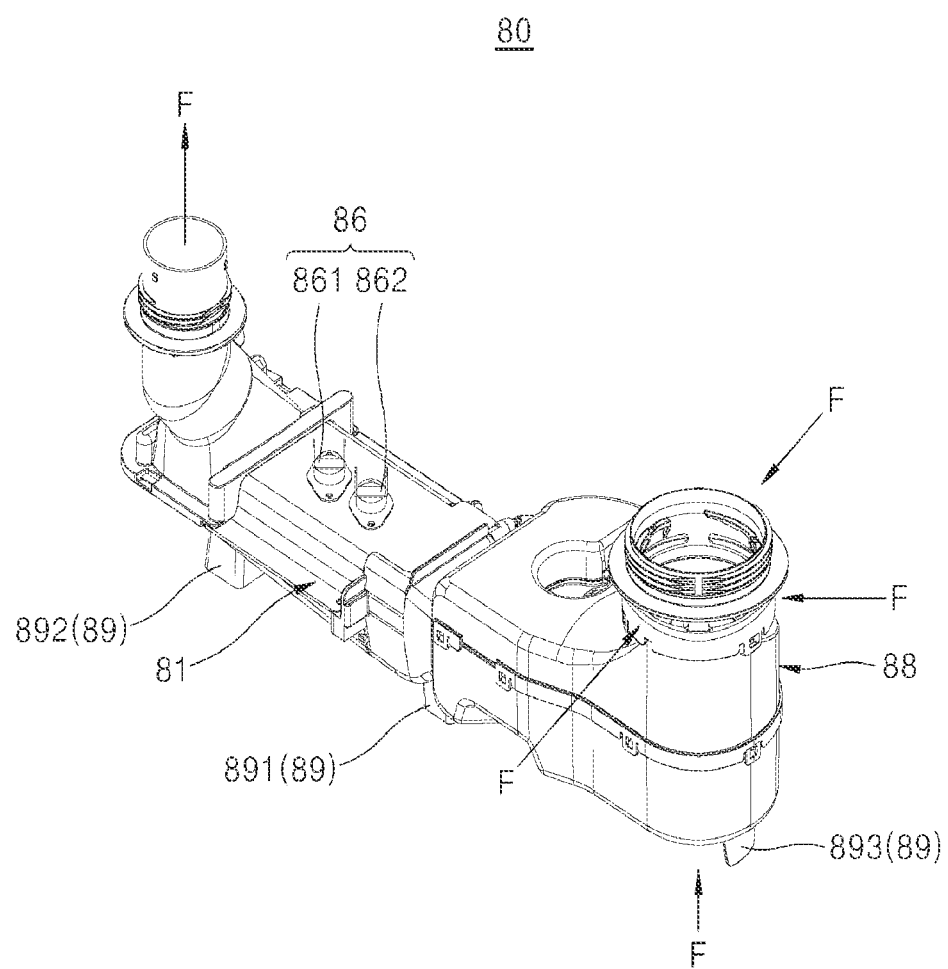
FIG. 6 is a rear perspective view showing the dry air supply part in FIG. 3.

Additionally, as illustrated in FIG. 4, a support rib 96 for supporting the dry air supply part 80 and preventing the escape of the dry air supply part 80, a plurality of guide ribs 98 setting the position of a leakage detecting part that detects whether wash water leaks from the tub 20 and preventing the escape of the leakage detecting part, and a wash water rib 97 for guiding wash water being discharged from the dry air supply part 80 to the leakage detecting part may be provided on the lower surface 91 of the base 90.

The support rib 96, the guide ribs 98 and the wash water rib 97 may be formed integrally on the lower surface 91 of the base 90.

As illustrated, the support rib 96 may be divided into a first support rib 961 that supports the middle portion of the dry air supply part 80 from below, and a second support rib 962 that supports the left side of the dry air supply part 80 from below.

A below-described first leg 891 of the dry air supply part 80 is coupled to the first support rib 961, and a below-described second leg 892 of the dry air supply part may be coupled to the second support rib 962.

FIGS. 5 to 8 show a detailed configuration of the dry air supply part 80.

As illustrated, the dry air supply part 80 generating dry air and supplying the same into the tub 20 may comprise an air blowing fan 83 that generates dry airflow F to be supplied into the tub 20, a heater 84 that heats dry air, a heater housing 81 that has an air passage C in which the heater 84 is accommodated, and a filtering part 88 that filters air to be suctioned into the air blowing fan 83.

The air blowing fan 83 is disposed at the upstream side in the direction of dry airflow F with respect to the heater 84 and the heater housing 81, and accelerates air to the air passage C formed in the heater housing 81 to generate dry airflow F.

The air blowing fan 83, and an air blowing motor generating rotational driving force of the air blowing fan may be mutually modularized, and form an assembly in a way that the air blowing fan and the air blowing motor are accommodated in the fan housing 82.

The air blowing fan 83 and the fan housing 82 may be fixed to a housing connector 87 that connects a filer housing 881 of the below-described filtering part 88 and the heater housing 81.

Specifically, the air blowing fan 83 and the fan housing 82 may be accommodated entirely in the filter housing 881 in the state of being fixed to the housing connector 87.

The type of the air blowing fan to be applied to the dry air supply part 80 is not limited, but a sirocco fan, for example, is preferred considering the position and space limitations in the installation of the air blowing fan.

When a sirocco fan is applied as shown in the illustrative embodiment, filtered air may be suctioned from a lower surface 824 of the fan housing 82, in a direction parallel a direction from the center of the sirocco fan to the rotational axis of the same, and be accelerated and discharged outward in the radial direction.

The accelerated and discharged air may form dry airflow F and be drawn into the air passage C in the heater housing 81 through the fan housing 82 and an inlet 8712 of the housing connector 87.

At this time, the air blowing fan, e.g., a sirocco fan, and a rotation shaft 831 of the motor may be disposed to have directionality approximately parallel with the up-down direction (U-D direction), and filtered air may be suctioned through the lower surface 824 of the fan housing 82, for example.

Further, a PCB substrate for controlling the moor may be built into an upper surface 821 of the fan housing 82, which is on the opposite side of the lower surface 824 into which filtered air is suctioned.

The fan housing 82, as illustrated, may be fixed to a ring-type connection tab 872 provided at the housing connector 87 through a fastening means such as a screw bolt, or the like, for example.

Figure 7:
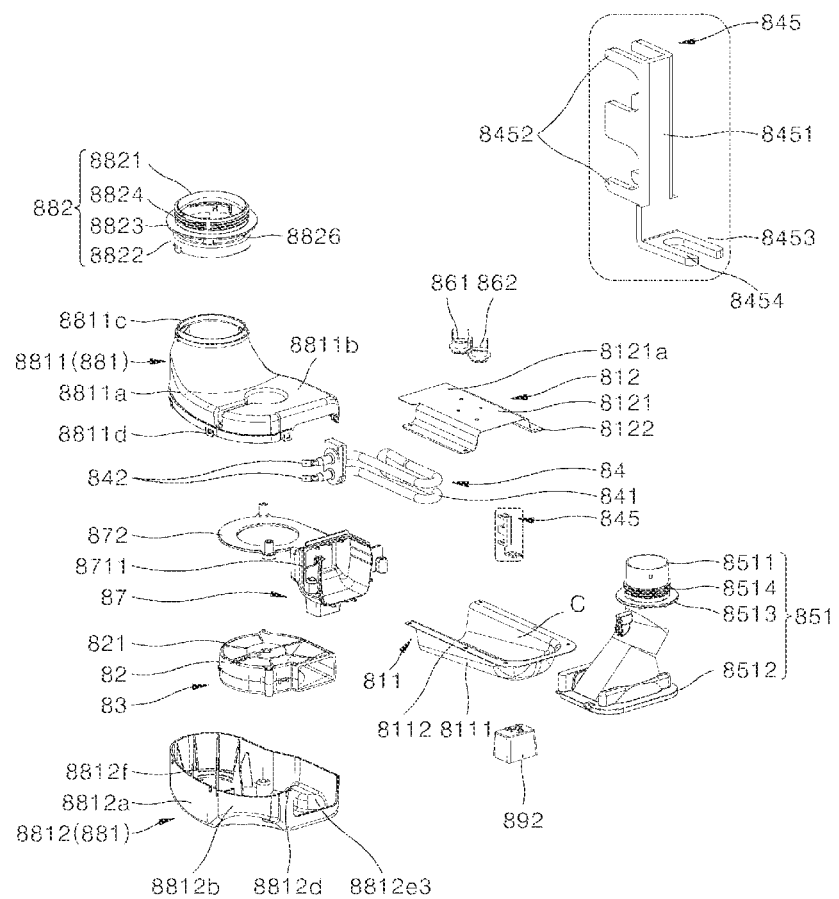
FIGS. 7 and 8 are exploded perspective views showing the dry air supply part in FIG. 3.
Figure 8:
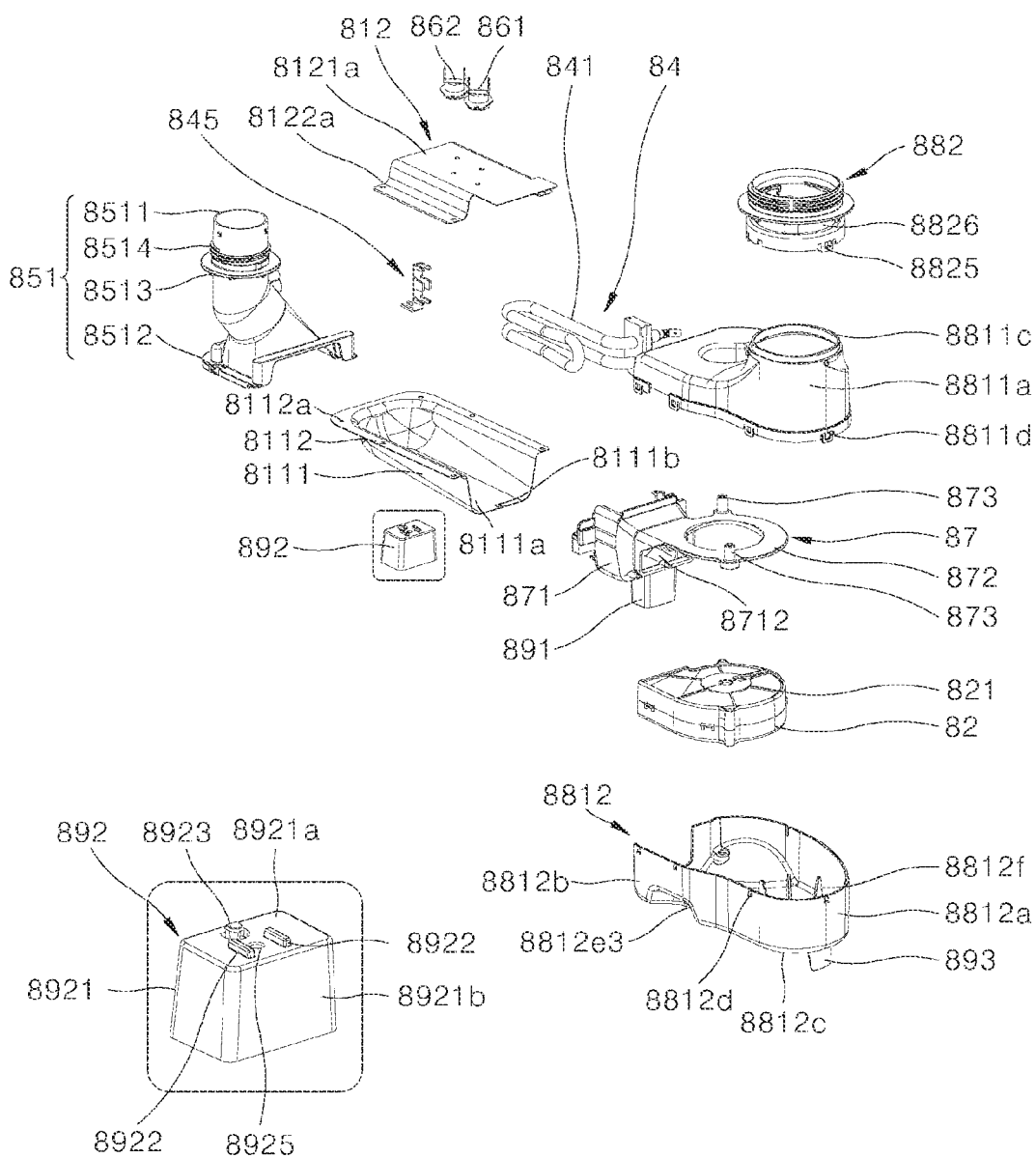

The connection tab 872 may extend in a direction where the connection tab 872 covers from the inlet 8712 of a connector main body 871 to the upper surface 821 of the fan housing 82, and the connection tab 872, as illustrated in FIGS. 7 and 8, may be provided with a pair of fastening bosses 873 that extend from the upper surface of the connection tab 872 in the upward direction (U-direction).

Each of the pair of fastening bosses 873 may have a screw hole to which a screw bolt is screw-coupled.

At a time of screw bolt-based fastening, the connection tab 872 and the fan housing 82 may be assembled in a reversed state of the state in FIGS. 7 and 8, i.e., in the state where the up-down positions of the connection tab 872 and the fan housing 82 are reversed, or in an upside-down state of the connection tab 872 and the fan housing 82. At this time, the pair of fastening bosses 873 may serve as a leg that supports the connection tab 872 and the fan housing 82 against the gravitational direction in a non-fastening state.

The heater 84 is disposed in the air passage C of the heater housing 81, and preferably, is directly exposed to dry airflow F in the air passage C and heats the dry airflow F.

When the dry air supply part 80 supplies high-temperature dry air, power may be supplied to the heater 84, and the heater may heat dry air, and when the dry air supply part 80 supplies low-temperature dry air, the supply of power to the heater 84 may be cut off, and the heater 84 may stop operating.

At this time, when low-temperature dry air is supplied, the air blowing motor may keep operating to generate dry airflow F.

The type of the heater 84 provided in the dry air supply part 80 of one embodiment is not limited, but a tube-type sheath heater may be selected since the sheath heater has a relatively simple structure, ensures excellent heat generation efficiency and helps to prevent electric leakage caused by the reverse inflow of wash water that flows from the tub 20 reversely, for example.

To enhance heat exchange efficiency, the heater main body 841 that is a sheath heater may have a stereoscopic shape having a plurality of bends, to be directly exposed to dry airflow F at the air passage C in the heater housing 81 and ensure a maximum heat transfer surface.

One end portion and the other end portion of the heater main body 841 may pass through the front surface of the connector main body 871 of the above-described housing connector 87 and extend.

Additionally, a pair of terminals 842 for receiving power may be formed in one end portion and the other end portion of the heater main body 841.

As illustrated, the pair of terminals 842 may be installed in and fixed to the connector main body 871 through a terminal fixation part 843.

At this time, a fixation slot 8711 may be provided on the front surface of the connector main body 871 to allow the terminal fixation part 843 to be fitted and coupled to the connector main body 871 in a sliding manner.

A slit-type groove that extends in a sliding direction. i.e., in the up-down direction (U-D direction), may be formed on both lateral surfaces of the terminal fixation part 843, and while the terminal fixation part 843 slides from the upper side to the lower side, the edge of the fixation slot 8711 is inserted into the slit-type groove and fitted and coupled to the slit-type groove.

As described above, the front end side of the heater main body 841 may be fixed and supported by the terminal fixation part 843.

The rear end side of the heater main body 841, as illustrated in FIGS. 7 and 8, may be fixed and supported by a single heater bracket 845 disposed in the heater housing 81. That is, the rear end side of the heater main body 841 may be supported on the air passage through the heater bracket 845 in the state of being separated from the heater housing 81.

The heater bracket 845 may be made of a metallic material considering the function of the heater main body 841 that generates high-temperature heat, and preferably, manufactured in a way that a metallic sheet highly resistant against high temperature and moisture, e.g., a stainless steel-based sheet, is pressed.

For example, the heater bracket 845 may be manufactured to have an L shape as illustrated in the partially enlarged view of FIG. 7.

As shown in the illustrative embodiment, in the L shape, a perpendicular extension part 8451 that extends in the up-down direction (U-D direction) may be provided with two heater holders 8452 forcibly coupled to the outer surface of the heater main body 841 in response to two rows of the heater main body 841 to effectively support the heater main body 841 that extends in two rows.

A pair of heater holders 8452 may be provided, and spaced vertically from the perpendicular extension part 8451 in response to the two rows of the heater main body 841 that are spaced along the up-down direction (U-D direction). Each of the heater holders 8452 may have a C-shaped exterior to correspond to the exterior of the tube-type heater main body 841.

Each of the heater holders 8452 may be forcibly coupled to the outer surface of the heater main body 841 in a way that the heater holder 8452 is plastically deformed as the heater holder 8452 is coupled to the heater main body 841, and before being fixed to a bottom surface 8111a of the heater housing 81, may be forcibly coupled to the heater main body 841 and modularized in advance.

In the L shape, a horizontal extension part 8453 that extends approximately along the left-right direction (Le-Ri direction) may be integrally formed at the lower end of the perpendicular extension part 8451.

The horizontal extension part 8453 may directly contact the bottom surface 8111a of the lower housing 811 and support the heater main body 841 and the heater bracket 845, and be fixed to the bottom surface 8111a of the lower housing 811.

The horizontal extension part 8453 may have a notch-type bolt groove 8454 through which a screw bolt passes and extends such that the horizontal extension part 8453 is fixed to the bottom surface 8111a of the lower housing 811 through a fastening means such as a screw bolt and the like. Accordingly, the horizontal extension part 8453 may have a U shape with the bolt groove 8454.

A screw bolt that fixes the horizontal extension part 8453 may pass through the bolt groove 8454 and the bottom surface 8111a of the lower housing 811, extend to the second leg 892 disposed under the horizontal extension part 8453 outside the lower portion of the lower housing 811, and be screw-coupled to the second leg 892.

That is, the heater bracket 845, the lower housing 811 and the second leg 892 may be fastened at the same time by a single screw bolt, thereby simplifying a fastening structure and an assembly process.

Further, as illustrated in FIGS. 5 to 8, a temperature sensor as a temperature sensing part 86 sensing the temperature of high-temperature dry air generated through the heater 84 or detecting the overheating of the heater 84 may be provided on an upper side surface 8121a of an upper housing 812 of the heater housing 81.

For example, the temperature sensor may comprise a thermistor 861 that senses the temperature of dry air, and a thermostat 862 that detects the overheating of the heater 84.

An output signal of the temperature sensor may be delivered to a non-illustrated controller, and the controller may receive the output signal of the temperature sensor to determine the temperature of high-temperature dry air and the overheating of the heater 84. As the heater 84 overheats, the controller may cut off the supply of power to the heater 84 and change the operation mode of the dry air supply part 80 from the high-temperature dry air mode to the low-temperature dry air mode.

The heater housing 81 may be formed into a hollow hole that has a vacant inner space such that the air passage C, in which the above-described heater main body 841 and heater bracket 845 are disposed, is formed.

At this time, for dry airflow F to move, the front end portion of the heater housing 81, corresponding to the upper stream side with respect to the direction of the movement of the dry airflow F. and the rear end portion of the heater housing 81, corresponding to the lower stream side with respect to the direction of the movement of the dry airflow F, may be open at least partially.

To easily form the air passage having the front end portion and the rear end portion that are at least partially open, as described above, the heater housing 81 may comprise a lower housing 811 and an upper housing 812 that are disposed in a way that the lower housing 811 and the upper housing 812 are divided with respect to the up-down direction (U-D direction), for example. Hereafter, the heater housing 81 comprising the lower housing 811 and the upper housing 812, which are disposed in a way that the heater housing 81 is divided in the up-down direction as illustrated, is described as an example, but not limited.

The lower housing 811 constituting the lower portion of the heater housing 81 may comprise a concave part 8111 that is convex downward in the state where the lower housing 811 is disposed, and an expansion surface 8112 that extends horizontally in the form of a flange from the circumferential edge of the concave part 8111.

For example, the concave part 8111 and the expansion surface 8112 may be formed integrally.

The concave part 8111 that is convex downward constitutes the lower portion of the air passage C formed in the heater housing 81.

A maximum length of the air passage C may be ensured with respect to the direction of the flow of dry airflow F, as illustrated, and to improve the efficiency of heat exchange with the heater 84 disposed in the heater housing 81, the left-right length of the concave part 8111 may be greater than the front-rear width of the concave part 8111.

Additionally, the right end portion of the lower housing 811, corresponding to the upper stream with respect to the direction of the movement of dry airflow, may be open in a way that the right end portion is entirely cut perpendicularly, and the left end portion, corresponding to the lower stream, may be closed rather than being opened.

A bottom surface 8111a of the concave part 8111 may be formed into an inclined surface the up-down height of which increases gradually from the right end portion of the lower housing 811 to the left end portion. By doing so, the cross-sectional area of the air passage C formed through the bottom surface 8111a may decrease gradually, and flow loss, caused by the generation of eddy current at the left end side where the direction of dry airflow changes, may be minimized.

The bottom surface 8111a of the concave part 8111 may have a plurality of penetration holes 8111b comprising a fastening hole formed for a coupling to the above-described housing connector 87 and a coupling hole formed for fixing the above-described heater bracket 845 and the second leg 892.

At this time, at least a portion of the plurality of penetration holes 8111b may serve as a drain hole for discharging wash water, flowing reversely through a below-described connection duct part 85, toward the base 90.

The expansion surface 8112 extending in the form of a flange may be formed to extend approximately in parallel with the horizontal direction.

The expansion surface 8112 provides a means of increasing a contact surface with an expansion surface 8122 of the upper housing 812 and a duct main body 851 of the connection duct part 85, which are described below, to enhance coupling strength and to minimize the leakage of dry airflow. The minimization of the leakage of dry airflow may lead to the prevention of a reduction in the dry air supply efficiency of the dry air supply part 80.

In the illustrative embodiment, the expansion surface 8112 may be formed along the circumferential edge of the concave part 8111 expect for the right end portion of the lower housing 811 continuously and integrally.

As described above, the expansion surface 8112 of the lower housing 811 may have a plurality of screw holes 8112a that are formed in a way that penetrates vertically, such that the expansion surface 8122 of the upper housing 812 and the duct main body 851 of the connection duct part 85 may be effectively coupled to the expansion surface 8112 of the lower housing 811.

The lateral surface of the lower housing 811 connecting the bottom surface 811l a and the expansion surface 8112 of the lower housing 811 may be formed into at least any one of an inclined surface or a curved surface or a combination thereof, to prevent a rapid change in the cross-sectional area of the air passage C and minimize the flow resistance of dry airflow.

The lower housing 811 may be formed in a way that a metallic sheet that has strong resistance against high temperature and moisture, considering that the heater main body 841 generating high-temperature heat is disposed in the lower housing and that the lower housing is directly exposed to wash water flowing reversely from the tub 20, e.g., a stainless steel-based sheet having approximately uniform thickness, is pressed.

Additionally, the upper housing 812 constituting the upper portion of the heater housing 81 may comprise a concave part 8121 that is convex upward in the state where the upper housing 812 is disposed, and an expansion surface 8122 that extends horizontally in the form of a flange from the circumferential edge of the concave part 8121.

For example, the concave part 8121 and the expansion surface 8122 may be formed integrally.

The concave part 8121 that is convex upward constitutes the upper portion of the air passage C provided in the heater housing 81.

Like the lower housing 811, a maximum length of the air passage C may be ensured with respect to the direction of the flow of dry airflow F, as illustrated, and to improve the efficiency of heat exchange with the heater 84 disposed in the heater housing 81, the left-right length of the concave part 8121 may be greater than the front-rear width of the concave part 8121.

However, as described hereafter, the left-right length of the upper housing 812 may be less than the left-right length of the lower housing 811 to form an outlet from which dry air having passed through the heater main body 841 is discharged. That is, because of a difference in the left-right lengths, at least a portion of the left end side of the lower housing 811 may not be covered by the upper housing 812 and be open in the upward direction (U-direction). The left end side of the lower housing 811, which is open at least partially, forms an outlet that is open in the upward direction (U-direction).

The right end portion of the upper housing 812, corresponding to the upper stream, and the left end portion of the upper housing 812, corresponding to the lower stream, with respect to the direction of the movement of dry airflow may be open in a way that the right end portion and the left end portion are entirely cut perpendicularly.

An upper side surface 8121*a* of the concave part 8121 may be formed into a flat surface the up-down height of which is maintained constantly from the right end portion of the upper housing 812 to the left end portion. As described above, a temperature sensing part 86 may be attached to the outside of the upper side surface 8121*a* of the concave part 8121.

As illustrated in FIG. 7, the right end portion of the upper side surface 8121*a* formed into a flat surface may extend further toward the housing connector 87 than the expansion surface 8122. By doing so, the right end portion of the upper side surface 8121*a* may be inserted into the connector main body 871 of the housing connector 87 at least partially and coupled to the connector main body 871. Accordingly, as the upper housing 812 and the connector main body 871 are coupled, a contact surface or a coupling surface between the upper housing 812 and the connector main body 871 may increase, and the outward leakage of dry airflow may be minimized.

In response to the right end portion of the upper side surface 8121*a*, the connector main body 871 may be provided with a means for increasing a contact surface or a coupling surface with the right end portion of the upper side surface 8121*a* of the upper housing 812.

The expansion surface 8122 extending in the form of a flange may extend approximately in parallel with the horizontal direction in response to the expansion surface 8112 of the lower housing 811.

In the illustrative embodiment, the expansion surface 8122 may be formed at the front side and the rear side of the concave part 8121 except for the right end portion and the left end portion of the upper housing 812 continuously and integrally.

The expansion surface 8122 of the upper housing 812 may have a plurality of screw holes 8122*a* that are formed in a way that penetrates vertically, in response to the above-described screw holes 8112*a* of the lower housing 811.

Like the lower housing 811, the lateral surface of the upper housing 812 connecting the upper side surface 8121*a* and the expansion surface 8122 of the upper housing 812 may be formed into at least any one of an inclined surface or a curved surface or a combination thereof, to prevent a rapid change in the cross-sectional area of the air passage C and minimize the flow resistance of dry airflow.

Further, like the lower housing 811, the upper housing 812 may be formed in a way that a metallic sheet that has strong resistance against high temperature and moisture, e.g., a stainless steel-based sheet, is pressed.

The dry air supply part 80 may further comprise a connection duct part 85 that is coupled to an outlet, formed at the left end side of the heater housing 81 and being open in the upward direction (U-direction), and has an air passage therein.

As described above, the heater housing 81 and the air blowing fan 83 are disposed below the lower surface 25 of the tub 20. The connection duct part 85 guides dry air being discharged from the heater housing 81 to a predetermined position, i.e., the dry air supply hole 254 formed at the tub 20.

For example, the predetermined position may be the lower surface 25 of the tub 20, and the dry air supply hole 254 into which dry airflow F guided to the connection duct part 85 is drawn may be formed at a corner of the lower surface 25 of the tub 20, which is adjacent to the rear surface 23 and the left side surface 26.

As shown in the illustrative embodiment, the duct main body 851 of the connection duct part 85 may have a shape that is capable of changing the direction dry airflow and connecting the dry air supply hole 254 of the tub 20 and the outlet of the heater housing 81.

For example, the duct main body 851 of the connection duct part 85 may have a cylinder shape that allows of the fluid communication of a lower end portion 8512 with the outlet of the heater housing 81 and allows an upper end portion 8511 to extend in the upward direction (U-direction) and connect to the dry air supply hole 254.

The lower end portion 8512 of the duct main body 851 may be coupled to the lower housing 811 of the heater housing 81 in a sliding manner.

Specifically, a guide wall and a guide projection for guiding a sliding coupling and maintaining a coupling state of the expansion surface 8112 of the lower housing 811 may be integrally provided in the lower end portion 8512 of the duct main body 851, formed into a flange surface.

Additionally, a bridge part may be provided in the lower end portion 8512 of the duct main body 851 in a way that protrudes upward from the lower end portion 8512 of the duct main body 851, and the inner surface of the bridge part has a shape corresponding to the outer shape of the left end portion of the upper housing 812 such that the left end portion of the upper housing 812 is inserted in a sliding manner.

Further, considering the cross section of the rectangle-shaped outlet of the heater housing 81, the lower end portion 8512 of the duct main body 851 may have a rectangle pillar shape, and for the prevention of leakage, the upper end portion 8511 of the duct main body 851 may have a cylinder shape.

That is, the duct main body 851 may have a cylinder shape to improve the efficiency of a coupling between the upper end portion 8511 of the duct main body 851 and the dry air supply hole 254 of the tub 20 and to prevent leakage.

As a means of improving coupling efficiency and preventing leakage, a ring-type flange 8513 and a male screw part 8514 may be provided at the upper end portion 8511 side of the duct main body 851.

The upper end portion 8511 of the duct main body 851 passes through the lower surface of the tub 20 and extends in the upward direction (U-direction), and the upper end portion 8511 of the duct main body 851 and the male screw part 8514 may pass through the lower surface of the tub 20 at least partially, and protrude toward the inside of the tub 20.

A fastening nut may be coupled to the male screw part 8514 that is disposed by passing through the tub 20.

At a time of fixing and fastening the duct main body 851, the fastening nut is screw-coupled to the male screw part 8514 in the tub 20, and the upper end portion 8511 of the duct main body 851 may be fixed in the state of being exposed to the inside of the tub 20.

That is, the fastening nut 852 closely contacts the upper side of the lower surface of the tub 20, and the ring-type flange 8513 receives the force of being pulled toward the lower surface of the tub 20, with the fastening nut's coupling force, in the state of closely contacting the lower side of the lower surface of the tub 20. By doing so, adhesive force between the flange 8513 and the lower surface of the tub 20 increases. Thus, it is less likely that wash water leaks to the outer circumferential surface of the duct main body 851.

As a means of promoting the effect of preventing the leakage of wash water, an airtight ring made of an elastic material may be additionally provided between the flange 8513 and the lower surface of the tub 20.

As the upper end portion 8511 of the duct main body 851 is fixed to the tub 20 through the fastening nut 852, the up-down (U-D direction) movement of the left end side of the heater housing 81 is limited by the duct main body 851 and fixed.

By doing so, a support structure for the upper side of the dry air supply part 80 may be obtained without an additional fastening means.

A plurality of supporting legs 89 supporting the heater housing 81 and the like against the base 90 may serve as a support structure for the lower side of the dry air supply part 80.

The plurality of supporting legs 89 may comprise a first leg 891 that is provided under the housing connector 87 and supports the housing connector 87 with respect to the gravitational direction, a second leg 892 that is provided under the heater housing 81 and supports the heater housing 81 with respect to the gravitational direction, and a third leg 893 that is provided under the filtering part 88 and supports the filtering part 88 with respect to the gravitational direction.

For example, the first leg 891 may be formed integrally at the connector main body 871 of the housing connector 87 and protrude from the lower portion of the connector main body 871 toward the base 90.

Additionally, the second leg 892 may be coupled to the lower side of the lower housing 811 of the heater housing 81, and provided aside from the lower housing 811. The second leg 892 may be made of a different material. e.g., rubber having predetermined heat resistance and elasticity, from the material of the lower housing 811, to minimize the transfer of high-temperature heat generated from the lower housing 811 to the base 90 and effectively absorb vibrations and impacts.

Specifically, as illustrated in the enlarged view of FIG. 8, the second leg 892 is made of a different material apart from the lower housing 811 and assembled and fixed to the lower portion of the lower housing 811. Accordingly, the second leg 892 may be provided with a means of setting the right position of the second leg 892 with respect to the lower housing 811 and maintaining the temporary assembly of the second leg 892.

As such means, a plurality of coupling projections may be provided on an upper side surface 8921a of a leg body 8921 that plays the role of a coupling surface to the lower housing 811.

The plurality of coupling projections may comprise a pair of first coupling projections 8922 that extend in parallel with the lengthwise direction, i.e., the left-right direction, of the lower housing 811, and a second coupling projection 8923 that is provided between the pair of first coupling projections 8922 and an outer perimeter surface 8921b.

The right position and temporary assembly of the second leg 892 may be maintained in a way that the pair of first coupling projections 8922 and the second coupling projection 8923 are inserted into the first coupling hole and the second coupling hole provided on the bottom surface 8111a of the lower housing 811.

Additionally, a through hole 8925 through which a screw bolt fastening the heater bracket 845, the lower housing 811 and the second leg 892 at the same time passes as described above may be formed between the pair of first coupling projections 8922 on the upper side surface 8921a of the leg body 8921. A screw boss 8924 to which the screw bolt is screw-coupled may be formed integrally at the leg body 8921, under the through hole 8925.

Further, the third leg 893 may be integrally formed in the lower portion of the filter housing 881 constituting the filtering part 88 and protrude from the lower portion of the filter housing 881 to the base 90.

In some examples, an airflow guide that changes the direction of dry airflow being supplied through the duct main body 851 may be coupled to the upper end portion 8511 of the duct main body 851.

[Detailed Structure of Filtering Part and Housing Connector]

Hereafter, detailed structures of the housing connector 87 and the filtering part 88 of the dishwasher 1 of one embodiment are described with reference to FIGS. 9 to 11.

The housing connector 87 indirectly connects and fixes the fan housing 82 accommodating the air blowing fan 83 to the heater housing 81.

To this end, the fan housing 82 may be detachably coupled to one side of the housing connector 87, which is the upper stream with respect to the direction (hereafter, a longitudinal direction) of the flow of dry airflow, i.e., the right side in the illustrative embodiment.

Additionally, the open front end of the heater housing 81 may be detachably coupled to the other side of the housing connector 87, which is the lower stream with respect to the direction of the flow of dry airflow, i.e., the right side in the illustrative embodiment.

Specifically, the housing connector 87 may comprise a connector main body 871 which has a box shape and a front end portion 871a with an inlet 8712 to which dry airflow being discharged from the fan housing 82 is drawn, and a connection tab 872 which protrudes toward the fan housing 82 from the front end portion 871a of the connector main body 871 and to which the fan housing 82 is coupled.

The connector main body 871 is coupled to the open front end of the heater housing 81, disposed in the lower stream with respect to the direction of the flow of dry airflow, and forms an air passage C in which dry airflow flows together with the heater housing 81.

To this end, the connector main body 871 may have a box shape having a vacant inside and a hollow hole.

The connection tab 872 protruding from the front end portion 871a of the connector main body 871 forms the upper surface of an arm-type connector part 871a1 at least partially.

On the inner surface of the connector main body 871, the air passage C has a cross-sectional area that increases gradually along the direction of the flow of dry airflow, and the cross-sectional area of a rear end portion 871b of the connector main body 871, to which the heater housing 81 is coupled, may be approximately the same as the cross-sectional area of the front end portion of the heater housing 81. By doing so, the flow loss of dry airflow may be minimized.

The connector main body 871 may minimize the transfer of heat generated in the heater 84 to the fan housing 82 through the heater housing 81 and support the fan housing 82 and the heater housing 81.

To this end, the connector main body 871 may be manufactured in a way that a plastic material having predetermined heat resistance is injection-molded.

Additionally, the first leg 891 protruding toward the base may be integrally formed in the lower portion of the connector main body 871, to support the fan housing 82 and the heater housing 81.

In the illustrative embodiment, the upper surface and the front surface of the box-type connector main body 871 may be at least partially open.

The connector main body 871's upper surface and front surface that are at least partially open provide a passage into which the heater main body 841 enters in the processes of disposing and fixing the heater main body 841 in the air passage C.

The heater main body 841 may be indirectly supported in the state of being separated from the heater housing 81 and the connector main body 871.

The front end side of the heater main body 841 may be supported by the terminal fixation part in the state of being separated from the connector main body 871. A pair of terminals may be fixed to the front surface of the terminal fixation part, in the state of protruding outward.

The partially open front surface of the connector main body 871 forms a U-shaped fixation slot 8711 to which the terminal fixation part is coupled in a sliding manner, in response to the outer shape of the terminal fixation part.

The terminal fixation part may have a guide groove the up-down slide of which is guided by the edge of the fixation slot 8711 and which is coupled to the edge of the fixation slot 8711.

The partially open upper end of the connector main body 871 may be covered and shielded by the upper housing 812.

A plurality of second support ribs 8715 may be provided in the lower portion of a coupling surface 8716 and support the front end portion of the upper housing 812 having entered into the connector main body 871 from below.

The connector main body 871's rear end portion 871b that is open entirely may be fitted, coupled and fixed to the concave part 8111 of the lower housing 811 and the concave part 8121 of the upper housing 812 that form the inner surface of the heater housing 81.

At this time, the rear end portion 871b of the connector main body 871 may be fitted and coupled in a way that the rear end portion is partially inserted into the concave part 8111 of the lower housing 811 and the concave part 8121 of the upper housing 812.

Figure 10:
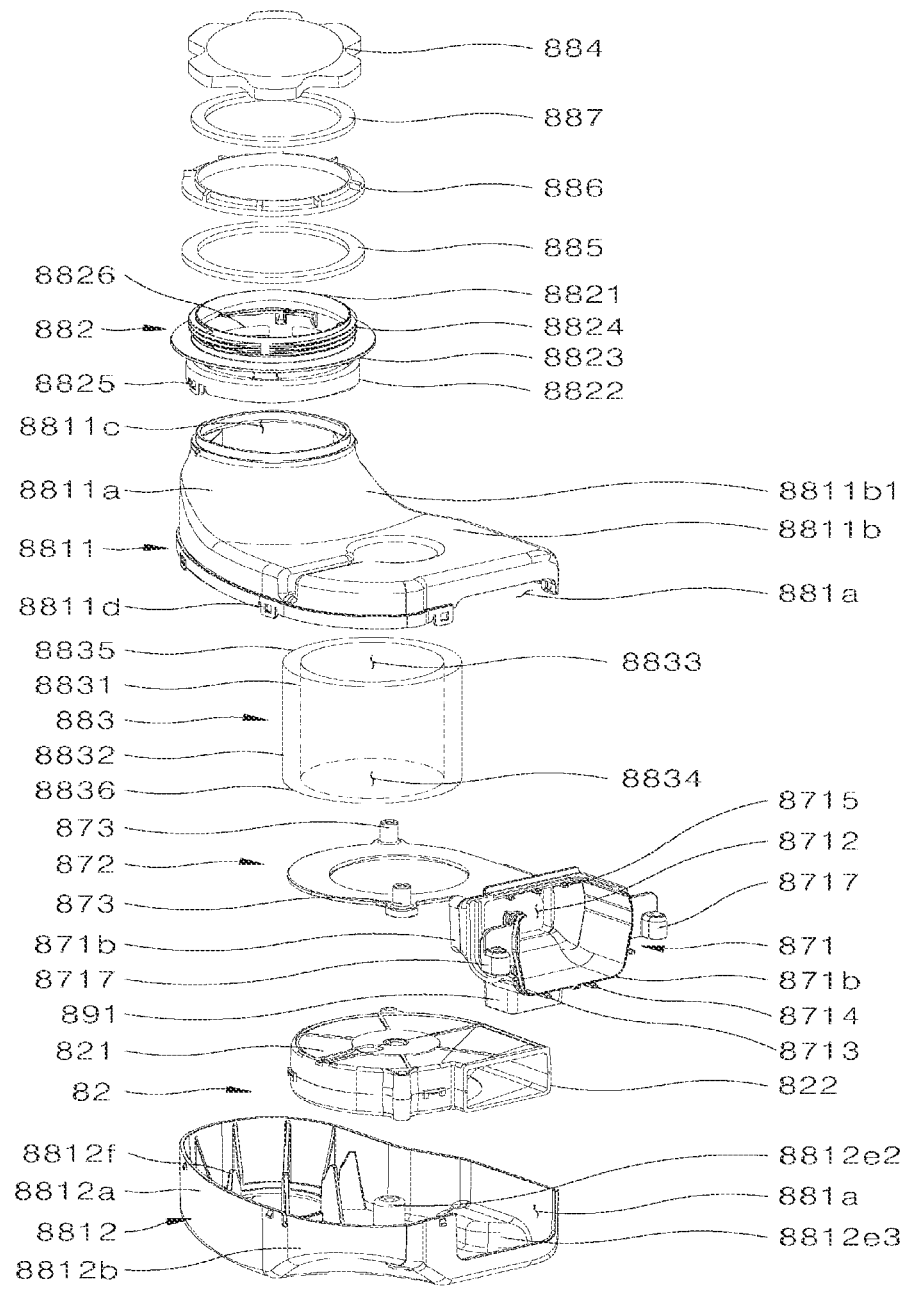
FIGS. 10 and 11 are exploded perspective views showing a filter housing, a filter member, a fan housing and a housing connector among the components illustrated in FIGS. 7 and 8.
Figure 11:
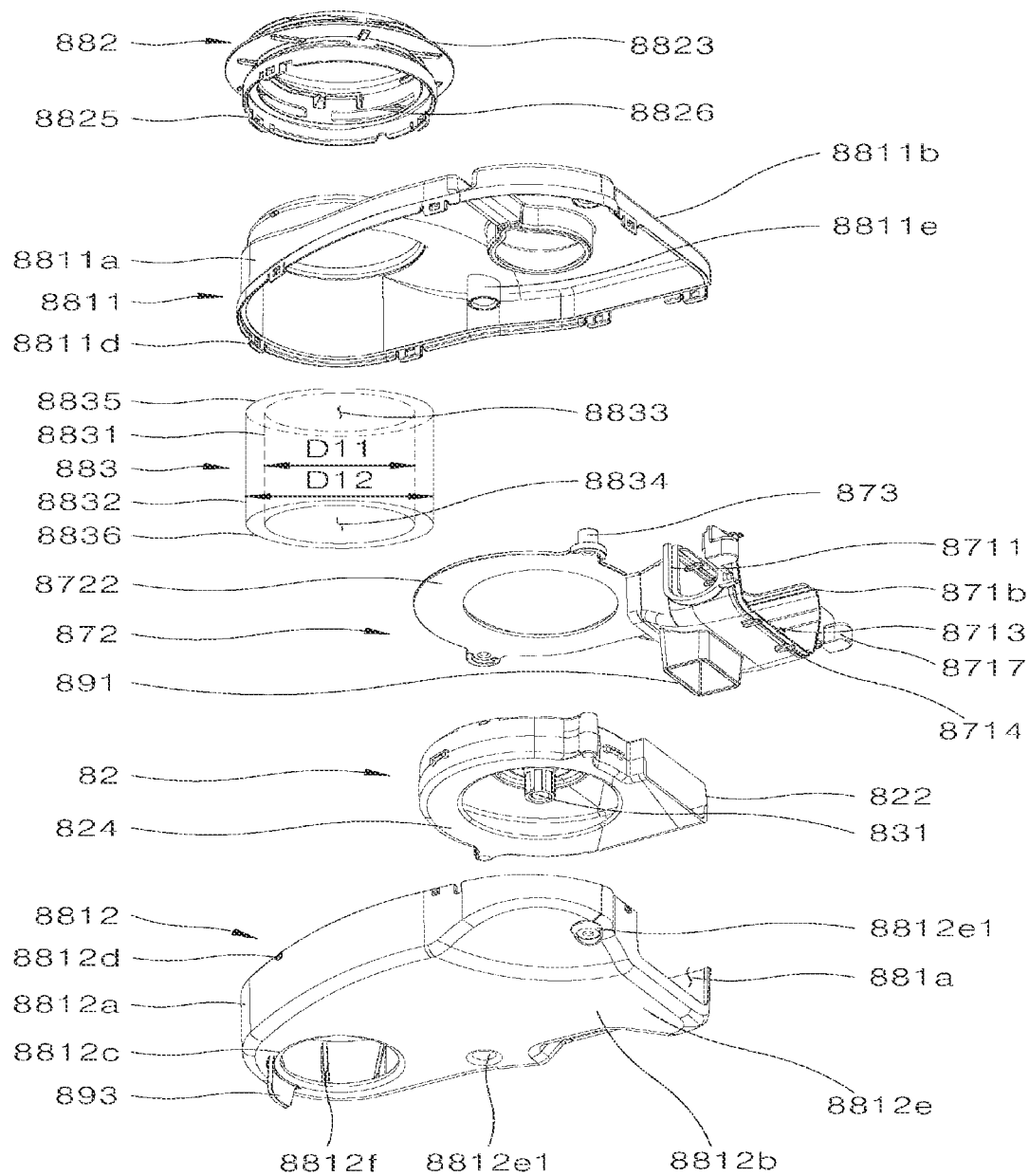

To ensure a fitted coupling forming surface contact in a similar way to the upper housing 812, a plurality of first support ribs 8714, as illustrated in FIG. 10, may be provided in the rear end portion 871b of the connector main body 871.

Additionally, the connection tab 872 may extend in parallel with an upper surface 821 of the fan housing 82 in a direction where the connection tab 872 covers from the inlet 8712 of the connector main body 871 to the upper surface 821 of the fan housing 82.

The connection tab 872 has a shape that covers the upper surface 821 of the fan housing 82 entirely. Accordingly, the connection tab 872 may be formed into a plate shape corresponding to the shape of the upper surface 821 of the fan housing 82 and extend from the upper side of the inlet 8712 approximately horizontally. For example, one end portion of the connection tab 872 connecting to the connector main body 871 is integrally formed at the front end portion 871a side of the connector main body 871, at the upper side of the inlet 8712, to form the upper surface of the above-described arm-type connector part 871a1.

As illustrated, a pair of fastening bosses 873 extending in the perpendicular direction or in the upward direction (U-direction) may be integrally provided on the upper surface 8721 of the connection tab 872.

The pair of fastening bosses 873 may have a screw hole respectively, therein, and one end portion of a screw bolt B having passed through the fan housing 82 may be screw-coupled to the screw hole as descried hereafter.

The pair of fastening bosses 873, as illustrated in FIG. 10, may be coupled to a guide boss 8811e provided in a first housing 8811 that corresponds to the upper housing of the filtering part 88 in the state where the pair of fastening bosses 873 are disposed in the base 90.

The filtering part 88 may be disposed in the upper stream of the heater 84 with respect to the direction of the flow of dry airflow, to filter air to be suctioned into the air blowing fan 83 and supply the filtered air to the heater 84.

Specifically, the filtering part 88 may comprise a filter member 883 that filters air to be suctioned into the air blowing fan 83, and a hollow hole-type filter housing 881 that has a filter accommodation space S1 in which the filter member 883 is disposed in a replaceable manner and a fan housing accommodation space S2 in which the fan housing 82 is disposed.

As illustrated in FIGS. 7 to 11, the filter housing 881 may comprise a first housing 8811 and a second housing 8812 that are disposed in the form of a segment body that is segmented with respect to the up-down direction (U-D direction), for example. At this time, the first housing 8811 may be the upper housing, and the second housing 8812 may be the lower housing.

Hereafter, the filter housing 881 comprising the first housing 8811 and the second housing 8812 that are divided and coupled vertically as illustrated is described as an example, but not limited.

The filter housing 881, as described above, accommodates and supports the filter member 883 and the fan housing 82 of the air blowing fan 83.

Accordingly, the first housing 8811 may be divided into a filter accommodation part 8811a and a fan housing accommodation part 8811b such that the first housing 8811 accommodates and supports the filter member 883 and the fan housing 82 at least partially, preferably, accommodates and supports the upper portion of the filter member 883 and the upper portion of the fan housing 82.

As illustrated, the lower surfaces of the filter accommodation part 8811a and the fan housing accommodation part 881b of the first housing 8811 are open entirely to allow the second housing 8812 to be coupled to the lower sides of the filter accommodation part 8811a and the fan housing accommodation part 8811b of the first housing 8811.

The filter accommodation part 8811a may be formed further upstream than the fan housing accommodation part 8811b with respect to the direction of the flow of dry airflow, and in the illustrative embodiment, formed on the right of the fan housing accommodation part 8811b.

The filter accommodation part 8811a, for example, may have an outer shape of a partial cylinder to accommodate the filter member 883 having a cylinder shape in a way that the filter member 883 may be inserted and withdrawn when the filter member 883 is replaced.

The filter accommodation part 8811*a* may have a coupling opening 8811*c* at the upper end thereof, and the coupling opening 8811*c* is open in the form of a circle in response to the outer shape of the filter member 883. The filter member 883 may move downward through the coupling opening 8811*c*, and move to a filter accommodation part 8812*a* of the second housing 8812.

The fan housing accommodation part 8811*b* may be formed further downstream than the filter accommodation part 8811*a* with respect to the direction of the flow of dry airflow, and in the illustrative embodiment, formed integrally at the filter accommodation part 8811*a*, on the right of the filter accommodation part 8811*a*, near the heater housing 81.

The fan housing accommodation part 8811*b* may have an inner shape corresponding to the outer shape of the upper portion of the fan housing 82, to cover the upper portion of the air blowing fan 83 entirely. For example, the fan housing accommodation part 8811*b* may have an upper surface formed into a flat plate.

However, a vent hole 8811*f* may be formed in the central portion of the upper surface of the fan housing accommodation part 8811*b*, to expose the fan housing 82's upper surface 821 area where the PCB substrate is disposed at least partially, thereby cooling the above-described PCB substrate and motor of the air blowing fan 83. A hollow hole cylinder-type vent duct 8811*g* may be formed under the vent hole 8811*f* and extend toward the upper surface 821 of the fan housing 82.

Additionally, a drain channel 8811*h* formed into a slit may be provided on the upper surface of the fan housing accommodation part 8811*b*, and one end portion of the drain channel 8811*h* connects to the lower end of the vent duct 8811*g*, and the other end portion of the drain channel 88111*h* extends to the front surface of the first housing 8811. By doing so, wash water drawn into the vent hole 8811*f* may move through the drain channel 8811*h* and be discharged toward the base 90.

As illustrated, the upper surface of the first housing 8811 may have an inclined surface 8811*b*1 that connects the upper end of the filter accommodation part 8811*a* and the fan housing accommodation part 8811*b*. As described below, the drain channel 8811*h* drains wash water leaked from the upper end of the filter accommodation part 8811*a* and then drawn into the vent duct 8811*g* along the inclined surface.

A detailed configuration of the vent hole 8811*f*, the vent duct 8811*g* and the drain channel 8811*h* is described below with reference to FIGS. 16 to 19.

Additionally, the first housing 8811 may have a pair of guide bosses 8811*e* protruding toward the fan housing 82 from the upper surface of the first housing 8811, therein. The guide bosses 8811*e* protrude toward the connection tab 872 of the above-described housing connector 87, and join the pair of fastening bosses 873 provided at the connection tab 872 respectively. For example, the lower end of each of the guide bosses 8811*e* may be formed into a hollow hole at least partially to allow the upper end of the pair of fastening bosses 873 to be inserted into the guide boss 8811*e*. By doing so, the upper end of each of the fastening bosses 873 may be inserted and join the lower end of the guide boss 8811*e*, corresponding to the upper end of the fastening boss 873.

Further, the left side surface of the fan housing accommodation part 8811*b* of the first housing 8811 is partially open to form a portion of a housing connector coupling hole 881*a*. The remaining portion of the housing connector coupling hole 881*a* may be formed on the left side surface of a below-described fan housing accommodation part 8812*b* of the second housing 8812.

The connector main body 871 of the housing connector 87 may be inserted into the filter housing 881 at least partially by passing through the housing connector coupling hole 881*a*. Accordingly, the shape of the housing connector coupling hole 881*a* may have a shape corresponding to the outer shape of the connector main body 871.

The second housing 8812 of the filter housing 881 is coupled to the lower portion of the first housing 8811 and forms a sealed accommodation space, and accommodates and supports the lower portions of the filter member 883 and the fan housing 82.

Like the first housing 8811, the second housing 8812 may be divided into a filter accommodation part 8812*a* and a fan housing accommodation part 8812*b*, to accommodate and support the lower portion of the filter member 883 and the lower portion of the fan housing 82.

As illustrated, the upper end of the second housing 8812 may be open entirely to be coupled to the lower end of the first housing 8811.

In response to the filter accommodation part 8811*a* of the first housing 8811, the filter accommodation part 8812*a* of the second housing 8812, provided under the filter accommodation part 8811*a* of the first housing 8811, may be provided with a plurality of filter guide ribs 8812*f* that guides the movement of the filter member 883 and prevent the filter member 883's escape from the right position at a time of inserting the filter member 883.

The filter guide rib 8812*f* may protrude from a bottom surface 8812*e* of the filter accommodation part 8812*a* upward, and the lower end of the filter guide rib 8812*f* may be integrally formed on the bottom surface 8812*e* of the filter accommodation part 8812*a*.

Additionally, in response to the filter member 883's outer shape formed into a cylinder, the plurality of filter guide ribs 8812*f* may be arranged and disposed radially around the filter member 883.

A detailed configuration of the plurality of filter guide ribs 8812*f* is described below with reference to FIGS. 13 to 15.

As the center of the plurality of filter guide ribs 8812*f*, a lower suction opening 8812*c* may be formed on the bottom surface 8812*e* of the filter accommodation part 8812*a* in a penetrating manner, and is open toward the lower surface of the base 90 and allows external air to be suctioned.

The lower suction opening 8812*c* may have a circle shape to correspond to the shape of a lower opening 8834 of the filter member 883 having a cylinder shape, and a relative position and size of the lower suction opening 8812*c* may be determined to allow external air to pass through the lower opening 8834 and to be smoothly suctioned into the filter member 883.

Specifically, the open surface area of the lower suction opening 8812*c* may be less than the open surface area of the lower opening 8834 of the filter member 883, and the diameter D2 of the lower suction opening 8812*c* may be less than the inner diameter D11 of the filter member 883.

Additionally, when viewed from the bottom surface of the base 90 in the state where the filter member 883 is inserted into and disposed in the filter accommodation space S1 completely, the lower suction opening 8812*c* may be entirely included in the area of the lower opening 8834 of the filter member 883.

Accordingly, external air suctioned into the lower suction opening 8812c may be effectively suctioned into the lower opening 8834 of the filter member 883 without leaking into the filter housing 881.

Further, as one airtight means, a first ring-type rib 8812g1 and a second ring-type rib 8812g2 may be formed around the lower suction opening 8812c of the bottom surface 8812e of the second housing 8812, and prevent non-filtered external air to be leaked and suctioned into the inner space of the filter housing 881 directly.

The first ring-type rib 8812g1 and the second ring-type rib 8812g2 join an inner circumferential surface 8831 and an outer circumferential surface 8832 at the lower end side of the filter member 883 in a way that the first ring-type rib 8812g1 and the second ring-type rib 8812g2 surface-contact the inner circumferential surface 8831 and the outer circumferential surface 8832 directly to prevent air from entering between the lower end of the filter member 883 and the bottom surface 8812e of the second housing 8812.

Furthermore, as another airtight means, a protruding surface 8811j may be provided at the coupling opening 8811c of the first housing 8811 in a way that protrudes toward the filter accommodation space S1. In the state where the filter member 883 is disposed in the filter accommodation space S1, the protruding surface 8811j surface-contacts and joins the outer circumferential surface 8832 at the upper end side of the filter member 883 in a way that pressurizes the outer circumferential surface 8832 directly. By doing so, an airtight structure may be ensured between the upper end of the filter member 883 and the first housing 8811.

A detailed configuration of the leakage prevention means or airtight means is described below with reference to FIGS. 13 and 14.

The fan housing accommodation part 8812b may be formed further downstream than the filter accommodation part 8812a with respect to the direction of the flow of dry airflow, and in the illustrative embodiment, formed integrally at the filter accommodation part 8812a, on the right of the filter accommodation part 8812a, near the heater housing 81.

The fan housing accommodation part 8812b may have an inner shape corresponding to the outer shape of the lower portion of the fan housing 82, to cover the lower portion of the air blowing fan 83 entirely.

The bottom surface 8812e of the fan housing accommodation part 8812b may be spaced a predetermined distance apart from the lower surface 824 of the fan housing 82, to allow filtered air to be suctioned effectively, and for example, be formed into a flat surface parallel with the horizontal direction.

As a means of spacing the fan housing 82 apart from the bottom surface 8812e of the fan housing accommodation part 8811b and supporting the fan housing 82, a plurality of uplifted surface parts 8812e3 and a screw boss 8812e2 that protrude from the bottom surface 8812e may be provided in the fan housing accommodation part 8812b.

The plurality of uplifted surface parts 8812e3 is provided to avoid another structure disposed under the second housing 8812, and for example, provided to avoid the base's ribs and leakage detecting part disposed under the second housing 8812.

Accordingly, the shape of an individual uplifted surface part 8812e3 may vary depending on the shape of another avoided structure.

The plurality of uplifted surface parts 8812e3 may be used as a support part that supports the fan housing 82 in the state of being spaced from the bottom surface of the fan housing accommodation part 8811b. Thus, the air blowing fan 83 may be disposed such that the lower surface 824 of the fan housing 82 surface-contacts the upper end surface of an individual uplifted surface part 8812e3.

The screw boss 8812e2 supports the lower surface 824 of the fan housing 82 together with an individual uplifted surface part 8812e3. Additionally, the screw boss 8812e2 may be provided with a bolt hole 8812e1 into which one of the pair of screw bolts fastening the fan housing 82 and the connection tab 872 of the housing connector 87 at the same time is inserted.

The remaining bolt hole 8812e1 may be formed at any one of the plurality of uplifted surface parts 8812e3 in a penetrating manner.

In the first housing 8811 and the second housing 8812 that are disposed in the form of a segment body as described above, the lower end of the first housing 8811 and the upper end of the second housing 8812 may be detachably coupled to each other.

To achieve the above-described detachable coupling relationship, a fastening tab 8811d extending toward the second housing 8812 is provided at the lower end of the first housing 8811, and a hook projection 8812d may be provided at the upper end of the second housing 8812 and fastened to the fastening tab 8811d based on a hook coupling.

A tub connection duct 882 may be detachably coupled and fastened to the coupling opening 8811c of the filter accommodation part 8811a of the first housing 8811.

The filter member 883 of the filtering part 88 of one embodiment may be replaced through the lower surface 25 of the tub 20.

To this end, the filter accommodation part 8811a of the first housing 8811 does not need to connect to the lower surface 25 of the tub 20, and the tub connection duct 882 connects the lower surface 25 of the tub 2 and the filter accommodation part 8811a of the first housing 8811.

The tub connection duct 882 may be integrally provided at the filter accommodation part 8811a of the first housing 8811. However, the tub connection duct 882 provided additionally in the first housing 8811 in the illustrative embodiment is described, hereafter.

Like the duct main body 851 of the above-described connection duct part 85, an upper end portion 8821 of the tub connection duct 882 may pass through the lower surface 25 of the tub 20 and extend upward as illustrated FIGS. 7 and 8.

Figure 9:
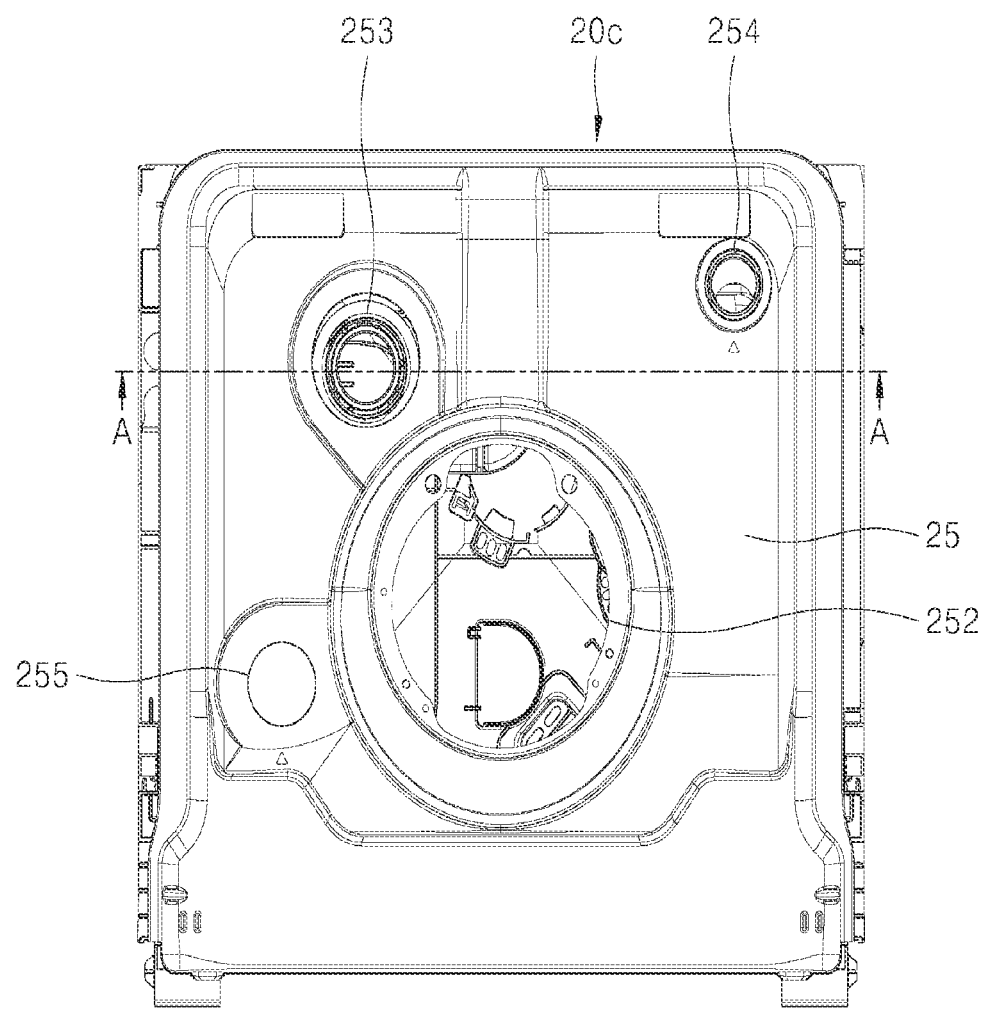
FIG. 9 is a plan view showing a tub of the dishwasher of one embodiment, which is mounted on a base.

As illustrated in FIG. 9, a filter replacement hole 253 may be provided on the lower surface 25 of the tub 20 to allow the upper end portion 8821 of the tub connection duct 882 to be inserted.

A sump hole 252 on which a sump is mounted may be provided in the central portion of the lower surface 25 of the tub 20. The lower surface 25 of the tub 20 may have a convergence surface having an inclination angle at which the convergence surface gradually inclines downward toward the sump hole 252.

As illustrated, the filter replacement hole 253 may be formed on the convergence surface, at the rear of the sump hole 252.

To distinguish the filter replacement hole 253 from the dry air supply hole 254, the filter replacement hole 253 may be formed at the corner adjacent to the rear surface and the right side surface, on the lower surface 25 of the tub 20. Additionally, to easily insert and withdraw the filter member 883 for replacement, the filter replacement hole 253 may be disposed closer to the front surface of the tub 20 than the dry air supply hole 254 and disposed further rearward than a water softener communication hole 255.

The water softener communication hole 255 formed in front of the filter replacement hole 253, for example, may be used to insert a water softening agent into a water softener provided under the water softener communication hole 255, and the like, or used for the replacement and maintenance and repairs of another component such as a purification filter of a water supply part, and the like.

The filter replacement hole 253 may be disposed between the water softener communication hole 255 and the dry air supply hole 254 with respect to the front-rear direction or the left-right direction.

That is, the filter replacement hole 253 may be disposed outside a virtual extension line that connects the water softener communication hole 255 and the dry air supply hole 254.

By doing so, even if the lower surface 25 of the tub 20 has a plurality of openings, the strength, torsional rigidity and flexural rigidity of the tub 20 may not decrease.

Additionally, to distinguish the filter replacement hole 253 from the water softener communication hole 255 formed in front of the filter replacement hole 253, a sealing cap 884 having a different shape or color from the water softener communication hole 255 may be provided at the upper end of the tub connection duct 882 that passes through the filter replacement hole 253 and is exposed to the wash space.

To improve coupling efficiency and prevent leakage between the upper end portion 8821 of the tub connection duct 882 and the filter replacement hole 253 of the tub 20, the tub connection duct 882 may be formed into a cylinder.

As a means of improving coupling efficiency and preventing leakage, a ring-type flange 8823 and a male screw part 8824 may be provided at the upper end portion 8821 side of the tub connection duct 882.

The upper end portion 8821 of the tub connection duct 882 may pass through the lower surface 25 of the tub 20 and extend in the upward direction (U-direction), and the upper end portion 8821 of the tub connection duct 882 and the male screw part 8824 may pass through the lower surface 25 of the tub 20 and protrude toward the inside of the tub 20 at least partially.

As described above, the filter replacement hole 253 is provided on the convergence surface provided on the lower surface 25 of the tub 20. Thus, the tub connection duct 882's upper end portion 8821 and flange 8823 coupled to the filter replacement hole 253 has a predetermined inclination angle with respect to the perpendicular direction in response to the inclination angle of the convergence surface of the tub 20, i.e., is formed to incline with respect to the perpendicular direction.

A fastening nut 886 may be coupled to the male screw part 8824 that is disposed by passing through the tub 20.

At a time of fixing and fastening the tub connection duct 882, the fastening nut 886 is screw-coupled to the male screw part 8824, in the tub 20. Accordingly, the upper end portion 8821 of the tub connection duct 882 may be fixed in the state of being exposed to the inside of the tub 20. A gasket 885 may be further provided between the fastening nut 886 and the lower surface 25 of the tub 20 to prevent the fastening nut 886 from loosening and prevent leakage.

As the tub connection duct 882 is fixed to the lower surface 25 of the tub 20 through a fastening duct, the sealing cap 884 may be coupled to the upper end portion 8821 of the tub connection duct 882 exposed to the inside of the tub 20. At this time, an airtight ring 887 for preventing leakage may be disposed between the sealing cap 884 and the upper end portion 8821 of the tub connection duct 882.

Additionally, an upper suction opening 8826 into which external air is suctioned may be formed under the flange 8823 corresponding to the upper side of the filter accommodation space S1, between the upper end portion 8821 and a lower end portion 8822 of the tub connection duct 882, in a penetrating manner.

The upper suction opening 8826 may be formed in a way that penetrates the cylinder-type tub connection duct 882 from the inner circumferential surface thereof to the outer circumferential surface thereof. For example, the upper suction opening 8826 may be provided as a plurality of penetration openings arranged and formed along the circumferential direction of the tub connection duct 882.

Since the upper suction opening 8826 is formed along the circumferential direction of the tub connection duct 882 that extends approximately perpendicularly, the upper suction opening 8826 is open approximately horizontally. External air suctioned into the upper suction opening 8826 forms airflow having directionality approximately parallel with the horizontal direction.

At this time, to prevent a reduction in strength of the tub connection duct 882, the upper suction opening 8826 provided as a plurality of penetration openings may be formed into a slit having an up-down height less than a circumferential width.

Further, each of the plurality of penetration openings constituting the upper suction opening 8826 may have the same open surface area to allow external air to be suctioned evenly along the circumferential direction.

The upper suction opening 8826 may be formed higher than an upper opening 8833 formed on an upper surface 8835 of the filter member 883, in the state where the filter member 883 is disposed in the filter accommodation space S1. Accordingly, the upper suction opening 8826 may be formed between the tub 20 and the upper surface 8835 of the filter member 883 with respect to the up-down direction.

After external air having passed through the upper suction opening 8826 in a direction parallel with the horizontal direction may enter into the filter member 883, the direction of the airflow changes, and the external air may be filtered while passing through the outer circumferential surface 8832 of the filter member 883.

That is, in the filtering part 88 according to the present disclosure, external air may flow into the filter member 883 through two suction paths comprising the lower suction opening 8812c and the upper suction opening 8826 that are spaced from each other in the up-down direction. By doing so, a sufficient flow rate of dry airflow F required to dry a wash target may be ensured effectively.

Figure 12:
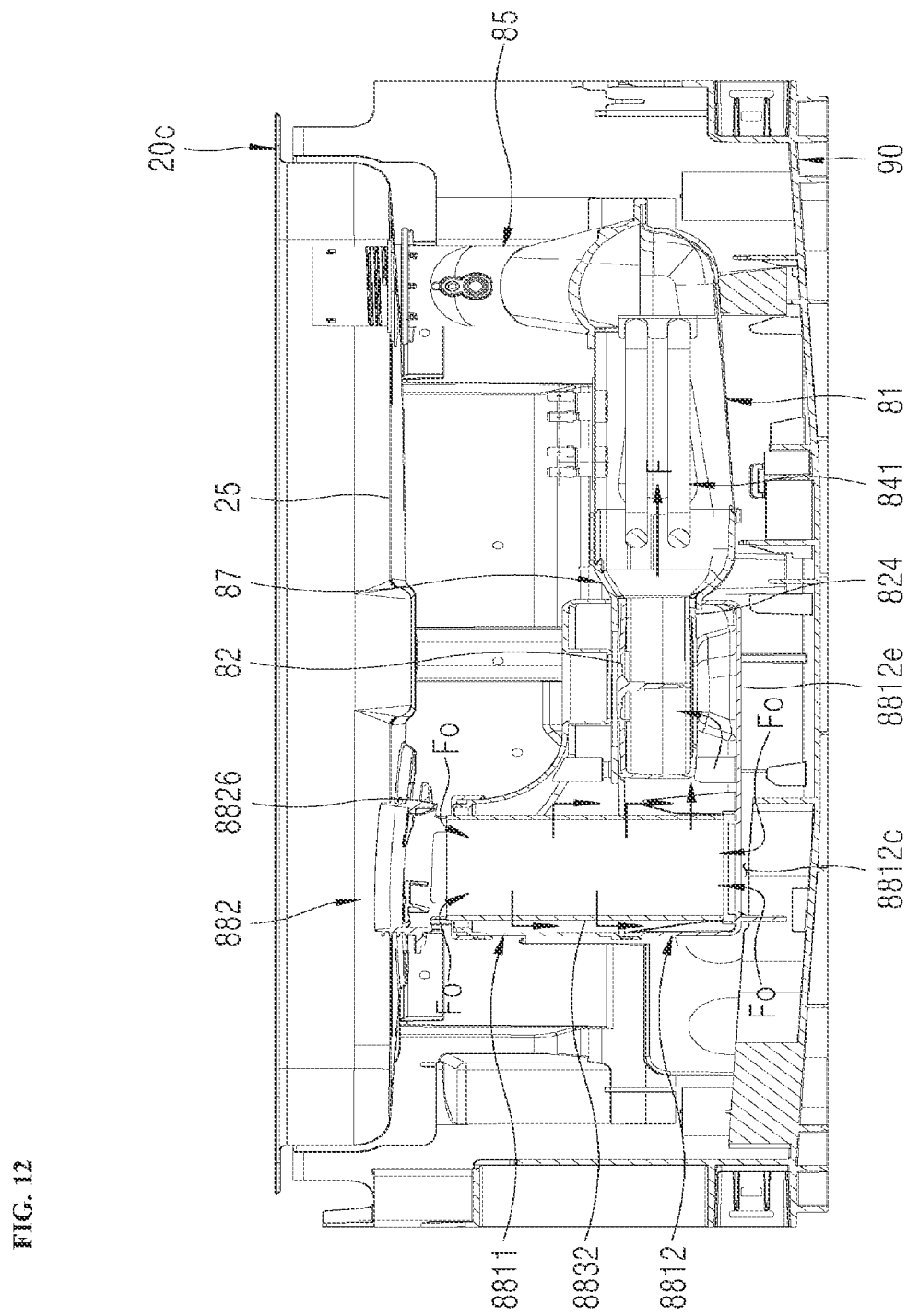
FIG. 12 is a cross-sectional view along A-A in FIG. 9.

The suction path of external air and the flow path of dry airflow having passed through the filter member are described hereafter with reference to FIG. 12.

Further, a fastening part 8825 for providing a detachably fastening function to the coupling opening 8811c of the first housing 8811 may be integrally provided in the lower end portion 8822 of the tub connection duct 882. For example, the fastening part 8825 may be a fastening means that is coupled to the coupling opening 8811c of the first housing 8811 based on a hook coupling.

[Air Flow Path Before and After Filtering]

Hereafter, the flow path Fo of external air before the external air passes through the filter member 883 of the dishwasher 1 of one embodiment, and the flow path of dry airflow F after external air passes through the filter member 883 and is filtered are described with reference to FIG. 12.

The first housing 8811 and the second housing 8812 of the filter housing 881 of the dishwasher 1 of one embodiment are configured to suction external air through a plurality of suction openings, which are spaced from each other in the up-down direction, and which are open toward a space between the base 90 and the tub 20.

As described above, the plurality of suction openings may comprise the upper suction opening 8826 provided at the tub connection duct 882 above the filter accommodation space S1, and the lower suction opening 8812*c* provided on the bottom surface 8812*e* of the second housing 8812 below the filter accommodation space S1.

As described above, the upper suction opening 8826 and the lower suction opening 8812*c* are spaced from each other and disposed respectively in the uppermost position and the lowermost position of the filter housing 881 with respect to the space between the tub 20 and the base 90. Accordingly, in the state where the effect of the flow rate of air suctioned respectively into the upper suction opening and the lower suction opening is minimized, external air may flow into the filter housing 881 through the two suction openings, thereby ensuring more flow rate of air required to dry a wash target and less time taken to dry a wash target than usual.

As illustrated, the upper suction opening 8826 is open in a direction approximately parallel with the horizontal direction. Accordingly, external air suctioned into the upper suction opening 8826 forms airflow of a direction parallel with the horizontal direction.

The lower suction opening 8812*c* is formed on the bottom surface 8812*e* that extends horizontally. Accordingly, the lower suction opening 8812*c* is open toward the base 90 in a direction parallel with the perpendicular direction, and external air suctioned into the lower suction opening 8812*c* forms airflow of a direction parallel with the perpendicular direction.

External air suctioned through the upper suction opening 8826 may enter into the upper opening 8833 of the filter member 883 disposed right under the upper suction opening 8826 in the state where the filter member 883 is disposed in the filter accommodation space S1.

Additionally, external suctioned through the lower suction opening 8812*c* may enter into the lower opening 8834 of the filter member 883 disposed right on the lower suction opening 8812*c* in the stat where the filter member 883 is disposed in the filter accommodation space S1.

As described hereafter, in the state where the filter member 883 is disposed, an airtight means for preventing non-filtered air from being suctioned into the filter housing 881 may be provided at the upper end side and the lower end side of the filter member 883. Accordingly, external air suctioned into the upper suction opening 8826 and the lower suction opening 8812*c* may enter into the upper opening 8833 and the lower opening 8834 of the filter member 883 respectively without causing leakage.

Further, in the state where the filter member 883 is disposed in the filter accommodation space S1, the upper opening 8833 of the filter member 883 is open toward the lower surface 25 of the tub 20, and the lower opening 8834 of the filter member 883 is open toward the lower surface of the base 90. Accordingly, the direction of airflow of external air changes downward while passing through the upper opening 8833, and external air having passed through the lower opening 8834 flows upward.

As described above, external air suctioned into the filter member 883 may pass through the inner circumferential surface 8831 of the filter member 883, constituting a filtering surface, and be evenly suctioned entirely in the up-down direction and circumferential direction. As a result, partial blocking, caused by the suction of external air through a specific portion of a filter member 883 in a related art, is less likely to occur.

Further, external air suctioned into the inner circumferential surface 8831 of the filter member 883 is filtered, and while passing through the outer circumferential surface 8832 of the filter member 883, is discharged, and immediately after the discharge, the direction of the flow of the external air changes.

As illustrated in FIG. 12, the direction of the flow of the filtered air having passed through the outer circumferential surface 8832 of the filter member 883 may change toward the lower surface 824 of the fan housing 82 that is open toward the bottom surface 8812*e* of the filter housing 881.

The lower surface 824 of the fan housing 82 is disposed in a position spaced upward from the bottom surface 8812*e*, between the lower end and the upper end of the filter member 883. Accordingly, air having passed through the filter member 883 in a position higher than the lower surface 824 of the fan housing 82 flows downward to the lower surface 824 of the fan housing 82, and air having passed through the filter member 883 in a position lower than the lower surface 824 of the fan housing 82 flows upward to the lower surface 824 of the fan housing 82.

Filtered air drawn into the fan housing 82 through the above-described flow path is accelerated by a fan and then drawn into the housing connector 87 and the inner space of the heater housing 81 through the vent duct 822, such that dry airflow F is formed.

[Detailed Configuration of Airtight Means of Filter Member]

Hereafter, a detailed configuration of a leakage prevention means or an airtight means of the filter member 883 provided in the filter housing 881 is described with reference to FIGS. 13 and 14.

Figure 13:
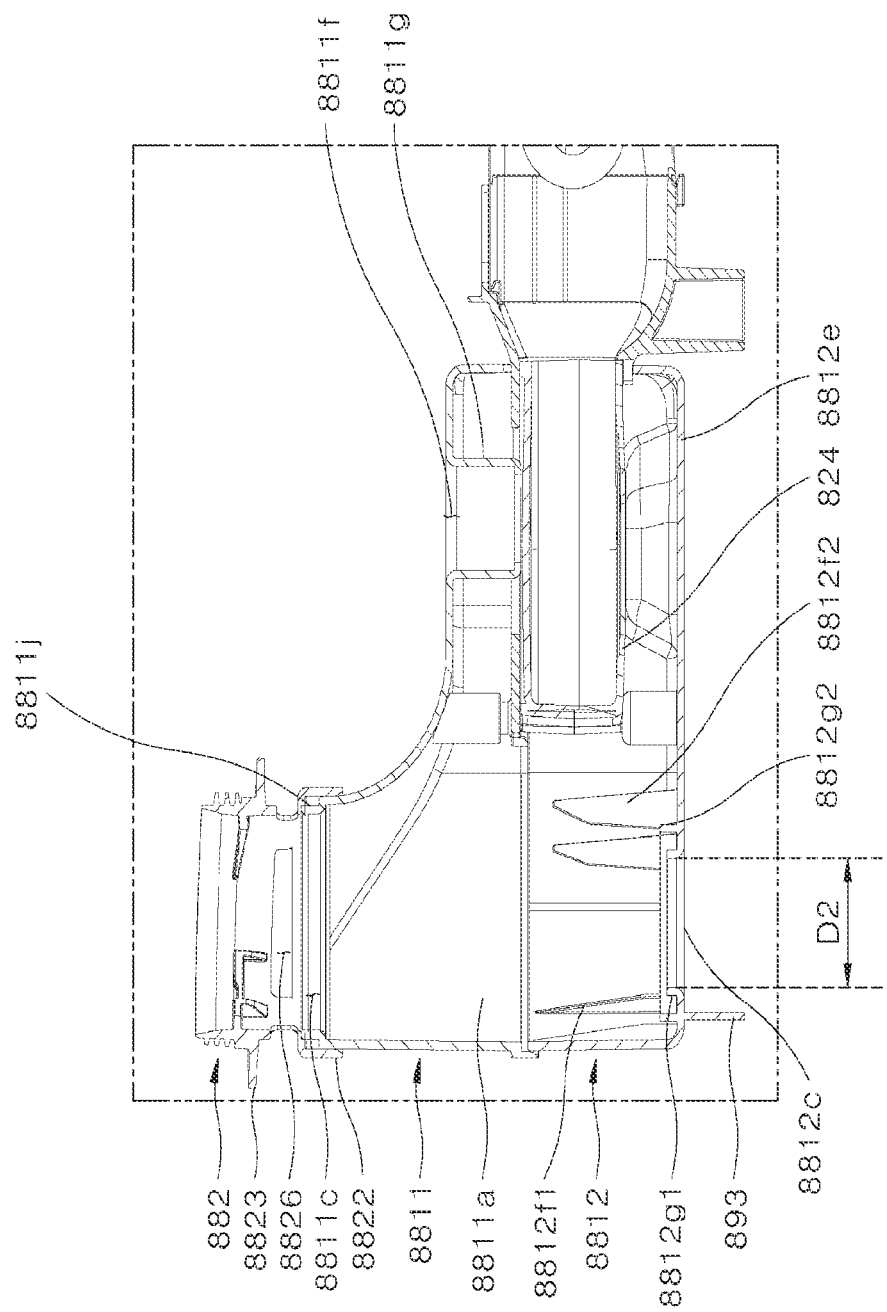
FIG. 13 is a partially enlarged view of FIG. 12.
Figure 14:
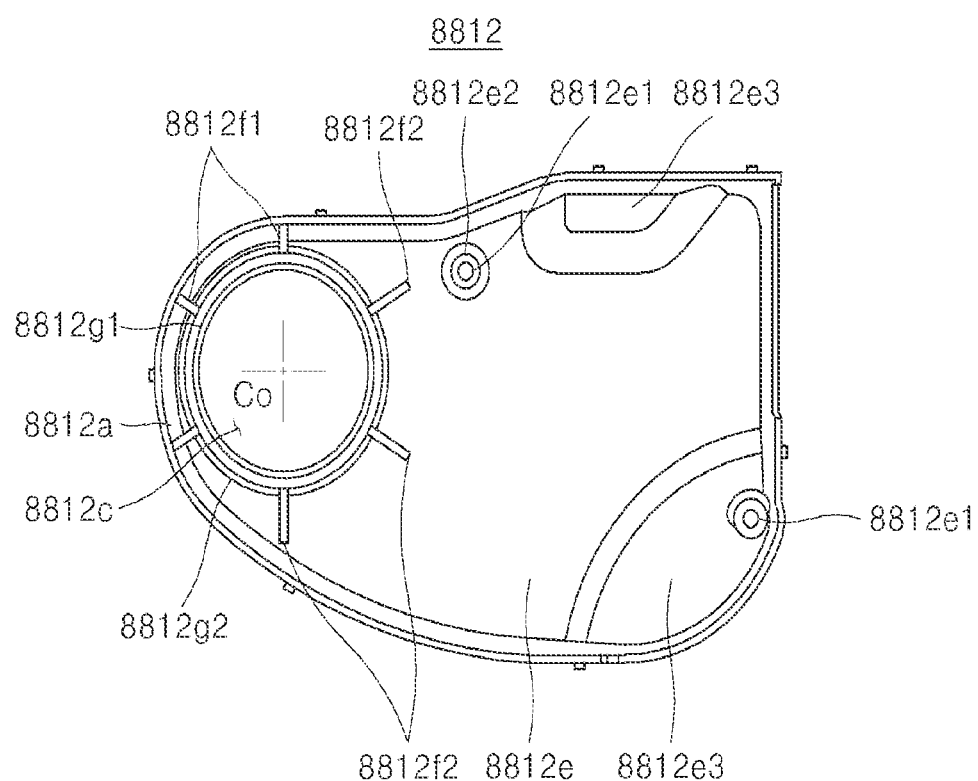
FIG. 14 is a plan view showing a second housing that constitutes a filter housing.

Referring to FIGS. 13 and 14, the first ring-type rib 8812*g*1 and the second ring-type rib 8812*g*2 may be formed around the lower suction opening 8812*c*, on the bottom surface 8812*e* of the second housing 8812, as an airtight means for preventing non-filtered external air from leaking and directly entering into the inner space of the filter housing 881.

The first ring-type rib 8812*g*1 and the second ring-type rib 8812*g*2 directly surface-contact and join the inner circumferential surface 8831 and the outer circumferential surface 8832 of the lower end side of the filter member 883, and prevents air from entering between the lower end of the filter member 883 and the bottom surface 8812*e* of the second housing 8812.

As described above, in the state where the filter member 883 is disposed in the filter accommodation space S1, the lower surface 8836 of the filter member 883 surface-contacts and joins the bottom surface 8812*e* of the filter housing 881 while surrounding the circumference of the lower suction opening 8812*c*. However, since the lower surface 8836 of the filter member 883 has a narrow radial width due to the characteristics of a material for the filtering surface applied to the lower surface 8836 of the filter member 883, the surface-contact between the lower surface 8836 of the filter member 883 and the bottom surface 8812*e* of the filter housing 881 is not enough to maintain the airtight state. The material for the filtering surface may comprise any one selected from a mesh filter or a HEPA filter, or a combination thereof.

The first ring-type rib 8812*g*1 and the second ring-type rib 8812*g*2 directly surface-contact help to increase a surface area of contact with the lower end side of the filter member 883 and promote an airtight effect.

For example, the first ring-type rib 8812g1 may extend along the circumference of the lower suction opening 8812c, preferably, along the circular edge of the lower suction opening 8812c, in the form of a ring, to form a cylindrical rib that protrudes upward from the circular edge of the lower suction opening 8812c.

Accordingly, the lower suction opening 8812c and the inner circumferential surface of the first ring-type rib 8812g1 form a single air passage in which the lower suction opening 8812c and the inner circumferential surface of the first ring-type rib 8812g communicate with each other, and the inner diameter of the first ring-type rib 8812g1 may be the diameter D2 of the lower suction opening 8812c.

In the state where the filter member 883 is disposed in the filter accommodation space S1, the first ring-type rib 8812g1 may pass through the lower opening 8834 of the filter housing 881 at least partially, and be inserted into the filter housing 881.

At this time, the outer diameter of the first ring-type rib 8812g1 may be greater than the diameter D2 of the lower suction opening 8812c, but may be almost the same as the inner diameter D12 of the lower opening 8834 of the filter member 883.

Thus, as the filter member 883 is disposed in the filter accommodation space S1, the first ring-type rib 8812g1 may pass through the lower opening 8834 of the filter member 883 at least partially, and enter into the filter member 883.

The outer circumferential surface of the first ring-type rib 8812g1 having entered into the filter member 883 may surface-contact and join the inner circumferential surface 8831 of the lower end of the filter member 883. By doing so, an airtight state may be achieved based on the surface-contact between the inner circumferential surface 8831 of the filter member 883 and the outer circumferential surface of the first ring-type rib 8812g1.

The height at which the first ring-type rib 8812g1 protrudes may be less than the height at which the second ring-type rib 8812g2 protrudes, as illustrated in FIG. 13.

Additionally, the second ring-type rib 8812g2 may extend along the circumference of the first ring-type rib 8812g1, in the form of a ring, outside the first ring-type rib 8812g1, in the radial direction of the first ring-type rib 8812g1, and protrude upward, for example.

Like the first ring-type rib 8812g1, the second ring-type rib 8812g2 joins the outer circumferential surface 8832 of the lower end of the filter member 883 to increase a surface area of contact with the filter member 883.

Accordingly, like the first ring-type rib 8812g1, the second ring-type rib 8812g2 may be provided as a single continuous cylindrical rib or a plurality of circular arc ribs that are arranged in a segmented manner. FIGS. 13 and 14 shows the second ring-type rib 8812g2 as a single continuous cylindrical rib, but the second ring-type rib 8812g2 is not limited. The illustrative embodiment is described hereafter.

As illustrated, the second ring-type rib 8812g2 may be spaced a predetermined distance apart from the outer circumferential surface of the first ring-type rib 8812g1. The distance may remain approximately constant along the circumferential direction, and a ring-type groove that is concave downward is provided between the first ring-type rib 8812g1 and the second ring-type rib 8812g2.

The distance may correspond to the radial thickness of the lower surface 8836 of the filter member 883. That is, the lower end of the filter member 883 may surface-contact and join the first ring-type rib 8812g1 and the second ring-type rib 8812g2 in a way that the lower end of the filter member 883 is fitted and coupled to the ring-type groove formed between the first ring-type rib 8812g1 and the second ring-type rib 8812g2.

In some examples, an additional frame or an additional reinforcement means for maintaining the shape and strength of the filter member 883 may be provided at the upper end and the lower end of the filter member 883.

Accordingly, when a frame or a reinforcement means is provided at the lower end of the filter member 883, the distance between the first ring-type rib 8812g1 and the second ring-type rib 8812g2 may be adjusted to correspond to the radial thickness of the frame or the reinforcement means.

Further, as another airtight means, a protruding surface 8811j protruding toward the filter accommodation space S1 may be provided at the coupling opening 8811c of the first housing 8811.

As illustrated, the protruding surface 8811j has a constant height to correspond to the shape of the outer circumferential surface 8832 of the upper end of the filter member 883, and may have a cylindrical surface shape that is continuously formed along the circumferential direction of the outer circumferential surface 8832 of the upper end of the filter member 883.

Further, in the state where the filter member 883 is disposed in the filter accommodation space S1, the protruding surface 8811j may be formed in a position lower than the upper suction opening 8826 with respect to the up-down direction.

At this time, the inner diameter of the protruding surface 8811j may be less than or the same as the outer diameter of the outer circumferential surface 8832 of the upper end of the filter member 883.

Accordingly, in the state where the filter member 883 is disposed in the filter accommodation space S1, the inner circumferential surface of the protruding surface 8811j surface-contacts and join the outer circumferential surface 8832 of the upper end of the filter member 883 entirely in the circumferential direction in a way that pressurizes the outer circumferential surface 8832 of the upper end of the filter member 883 directly. By doing so, an airtight structure between the upper end of the filter member 883 and the first housing 8811 may be achieved.

When like the above-described first ring-type rib 8812g1 and second ring-type rib 8812g2, a frame or a reinforcement means is provided at the upper end of the filter member 883, the inner diameter of the protruding surface 8811j may be adjusted to correspond to the outer diameter of the frame or the reinforcement means.

[Detailed Structure of Filter Guide Rib]

As described above, the filter member 883 of the dishwasher 1 of one embodiment may be disposed in the filter accommodation space S1 of the filter housing 881 in a replaceable manner.

To guide the movement and position of the filter member 883 to be inserted for replacement, a plurality of filter guide ribs 8812f may be provided on the bottom surface 8812e of the second housing 8812, as illustrated in FIGS. 13 and 14.

FIGS. 13 and 14 show an example comprising a total of six filter guide ribs 8812f. The number of the plurality of filter guide ribs 8812f may vary depending on the shape and size of the filter member 883. Hereafter, an illustrative embodiment provided with a total of six filter guide ribs 8812f is described.

The plurality of filter guide ribs 8812f may guide the movement of position of the filter member 883 at a time of inserting the filter member 883, and contact the outer circumferential surface 8832 of the filter member 883 directly to prevent the lower end of the filter member 883 from escaping from the right position after the filter member 883 is disposed.

To this end, as illustrated, each of the filter guide ribs 8812f may be formed into a plate-type rib the thickness of which remains constant in a direction parallel with the direction of the insertion of the filter member 883 and the lengthwise direction of the filter member 883. For example, an individual filter guide rib 8812f may have the same thickness.

Additionally, to minimize flow resistance against dry airflow passing through the outer circumferential surface 8832 of the filter member 883, the filter guide rib 8812f may be arranged to have a constant thickness in a direction parallel with the radial direction.

In particular, the plurality of filter guide ribs 8812f may be arranged around the lower suction opening 8812c, in a way that extends radially from the center Co of the lower suction opening 8812c, in the state where the lower end of the plurality of filter guide ribs 8812f integrally connects to the bottom surface 8812e of the second housing 8812, as illustrated. Specifically, the plurality of filter guide ribs 8812f may be arranged radially around the above-described second ring-type rib 8812g2.

At this time, the plurality of filter guide ribs 8812f may be arranged around the lower suction opening 8812c and the second ring-type rib 8812g2 at regular intervals such that the filter member 883 may be uniformly guided and supported by the plurality of filter guide ribs 8812f. As shown in the illustrative embodiment, the six filter guide ribs 8812f may be respectively arranged around the lower suction opening 8812c and the second ring-type rib 8812g2 at an angle of 60 degrees.

As illustrated in FIG. 14, the lower ends of the filter guide ribs 8812f may integrally connect to the second ring-type rib 8812g2 as well as being integrally formed on the bottom surface 8812e of the second housing 8812.

Specifically, the radial inner end portion surface side of the lower end of each filter guide rib 8812f may integrally connect to the second ring-type rib 8812g2.

At this time, a radial distance from the center Co of the lower suction opening 8812c to the inner end portion surface of the lower end of the plurality of filter guide ribs 8812f may be the same as the radius of the inner surface of the second ring-type rib 8812g2 such that the radial inner end portion surface of the filter guide rib 8812f may form the same surface as the inner circumferential surface of the second ring-type rib 8812g2.

By doing so, the outer circumferential surface 8832 of the lower end of the filter member 883 may be supported, in contact with the radial inner end portion surface of the filter guide rib 8812f and the inner circumferential surface of the second ring-type rib 8812g2 at the same time, in the state where the filter member 883 is disposed in the filter accommodation space S1.

To ensure the simultaneous contact, a perpendicular surface may be provided at a portion of the radial inner end portion surface of the filter guide rib 8812f, in response to the shape of the outer circumferential surface 8832 of the filter member 883.

The perpendicular surface may extend from the lower end of the filter guide rib 8812f along a direction parallel with the direction of the insertion of the filter member 883, preferably, have a predetermined height and extend along a direction parallel with the perpendicular direction.

Additionally, an inclined surface may be formed at the upper side of the perpendicular surface on the inner end portion surface of the filter guide rib 8812f, and a distance between the inclined surface and the filter member 883 gradually decreases in the downward direction toward the lower suction opening 8812c.

In other words, a space formed by the inclined surface of the plurality of filter guide ribs 8812f may expand gradually in a direction opposite to the direction of the insertion of the filter member 883, i.e., in the upward direction.

Accordingly, at a time of inserting the filter member 883, the size of the space into which the lower end of the filter member 883 enters may gradually decrease as the filter member 883 moves.

By doing so, as the filter member 883 is inserted downward, the lower end of the filter member 883 may be guided effectively to a space formed between the perpendicular surfaces of the inner end portion surfaces of the filter guide ribs 8812f.

However, the up-down height of the inclined surface of the plurality of filter guide ribs 8812f may differ. That is, with respect to the direction parallel with the direction of the insertion of the filter member 883, the height and entire height of the inclined surface may vary.

Figure 15:
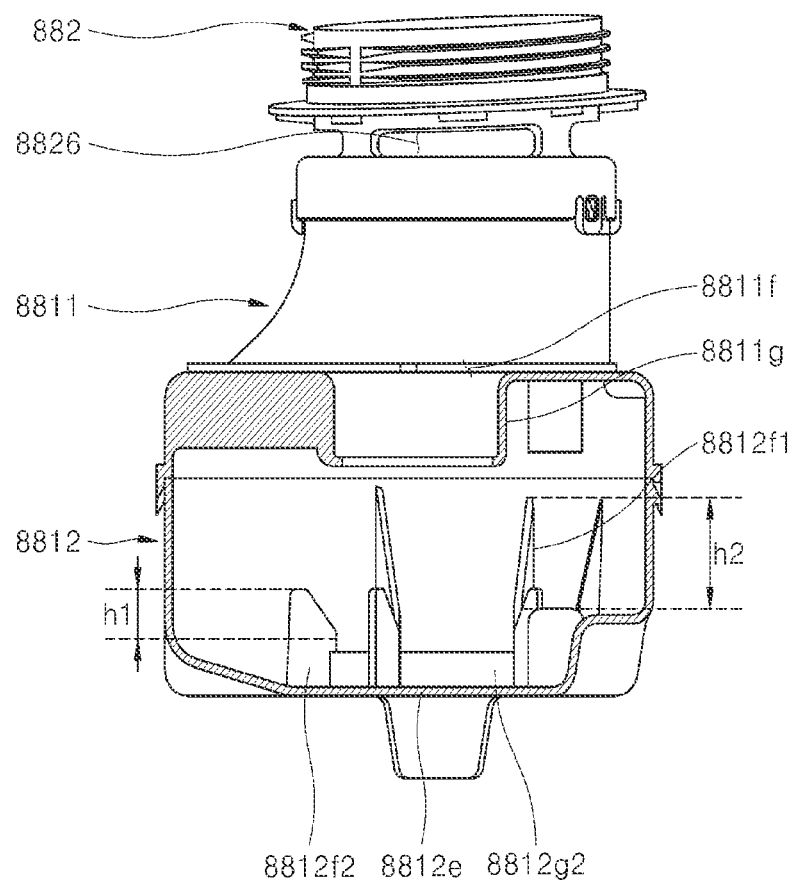
FIG. 15 is a transverse cross-sectional view showing a filter housing.

That is, as illustrated in FIGS. 13 to 15, the plurality of filter guide ribs 8812f may comprise a first guide rib 8812f1 having an inclined surface that is relatively high with respect to the direction of the insertion of the filter member 883, and a second guide rib 8812f2 having an inclined surface that is relatively low with respect to the direction of the insertion of the filter member 883.

The height h2 of the first guide rib 8812f1's inclined surface and the entire height of the first guide rib 8812f1 may be greater than the height h1 of the second guide rib 8812f2's inclined surface and the entire height of the second guide rib 8812f2's.

Additionally, as illustrated, the radial outer end portion surface of the first guide rib 8812f1 may integrally connect to the inner surface of the second housing 8812.

Accordingly, each of the lower end and the radial outer end portion surface of the first guide rib 8812f1 may integrally connect to the bottom surface 8812e and the outer perimeter surface of the second housing 8812.

By doing so, the first guide rib 8812f1 may help to improve the strength of the second housing 8812.

As illustrated, the radial outer end portion surface of the second guide rib 8812f2 may be configured in the state of separating from the inner surface of the second housing 8812.

Additionally, with respect to the relative position of the fan housing 82, the second guide rib 8812f2 may be disposed closer to the fan housing 82 than the first guide rib 8812f1, in the horizontal direction.

Thus, the second guide rib 8812f2 may serve as a vane that guides the flow of filtered air having passed through the outer circumferential surface 8832 of the filter member 883 to the open lower surface 824 of the fan housing 82 effectively.

However, to effectively guide the flow of filtered air and minimize flow resistance against filtered air, the up-down position of the upper end of the second guide rib 8812f2 may be limited between the lower surface 824 and the upper surface 821 of the fan housing 82, as illustrated in FIG. 13.

[Detailed Structures of Cooling Means of Air Blowing Motor and Wash Water Inflow Prevention Means]

Hereafter, detailed structures of the air blowing fan 83, a cooling means of an air blowing motor and the like and a wash water inflow prevention means, which are accommodated in the filter housing 881, are described with reference to FIGS. 16 to 19.

As described above, the air blowing fan 83 of the dishwasher of one embodiment is accommodated in the fan housing accommodation space S2 formed in the filter housing 881, in the state of being accommodated in the fan housing 82.

Additionally, to cool the motor and the PCB substrate constituting the air blowing fan 83, a vent hole 8811*f* for exposing the upper surface 821 of the fan housing 82 to the outside at least partially may be provided on the upper surface of the filter housing 881, specifically, on the upper surface of the first housing 8811.

Further, a hollow hole vent duct 8811*g* may be integrally formed on the upper surface of the first housing 8811 and extends toward the inside of the fan housing accommodation space S2, i.e., the upper surface of the fan housing 82.

As illustrated in FIG. 13, the open upper end of the vent duct 8811*g* may integrally connect to the upper surface of the first housing 8811, and the open lower end of the vent duct 8811*g* may extend downward to directly contact the upper surface 821 of the fan housing 82.

At this time, the open upper end of the vent duct 8811*g* serves as a vent hole 8811*f*. Accordingly, achieved is a structure that prevents non-filtered external air from flowing into the inner space of the filter housing 881 through the vent duct 8811*g* while enabling the upper surface 821 of the fan housing 82 to be exposed to external air at least partially through the vent duct 8811*g* having the above-described vent hole 8811*f* and to be cooled.

However, as described above, the filter member 883, accommodated in the filter housing 881 in a replaceable manner, may be inserted or withdrawn through the tub connection duct 882 that is exposed to the wash space through the filter replacement hole 253 which is formed on the lower surface 25 of the tub 20 in a penetrating manner.

Accordingly, at a time of replacing the filter member 883, it is likely that wash water remaining on the lower surface 25 of the tub 20 leaks into the filter housing 881 through the tub connection duct 882, or leaks through a gap formed between the tub connection duct 882 and the filter replacement hole 253.

At least a portion of the leaking wash water may be moved along the upper surface of the filter housing 881, specifically, along the inclined surface 8811*b*1 of the upper surface of the first housing 8811, by gravity, and flow into the vent hole 8811*f* and the vent duct 8811*g*.

The wash water having flown into the vent hole 8811*f* and vent duct 8811*g* may impose damage to electronic components such as the PCB substrate, the motor and the like accommodated in the fan housing 82.

As a means of preventing wash water-induced damage to the electronic components, a drain channel 8811*b* may provided on the upper surface of the fan housing accommodation part 8811*b*, on the upper surface of the first housing 8811 with one end of the drain channel 8811*h* being connected to the lower end of the vent duct 8811*g* and the other end of the drain channel 8811*h* being connected to the front surface of the first housing 8811.

Figure 16:
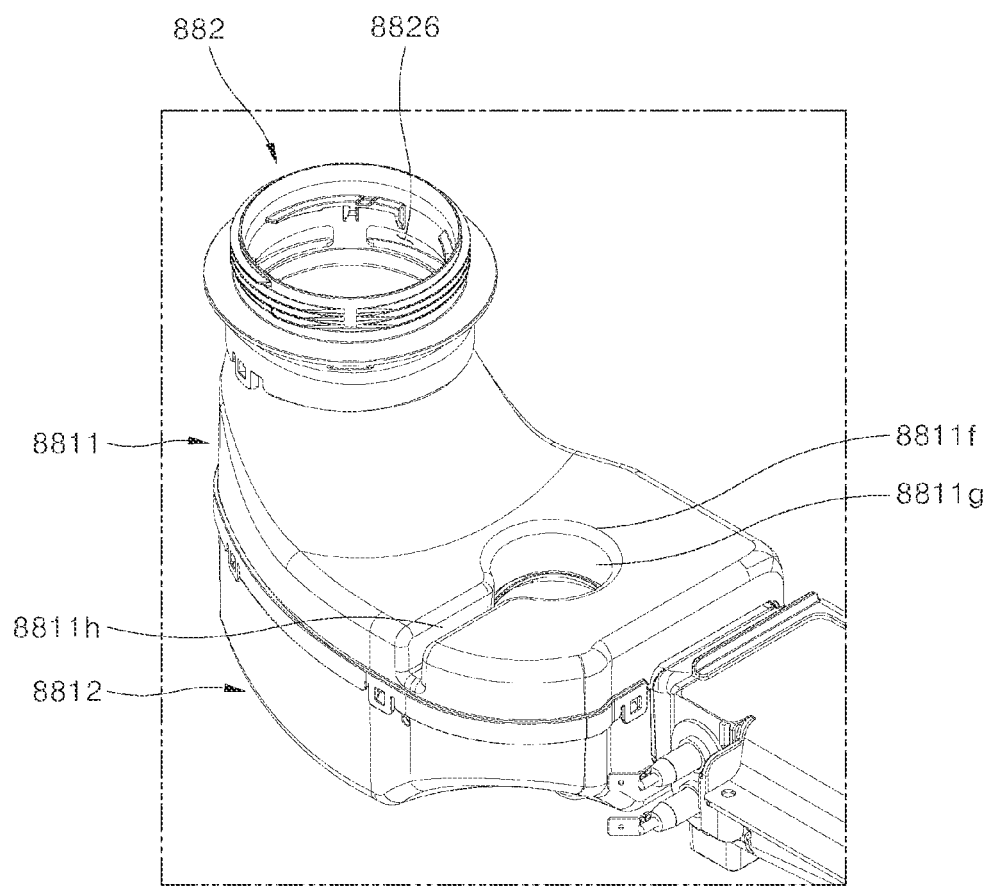
FIG. 16 is front perspective view showing a filter housing.
Figure 17:
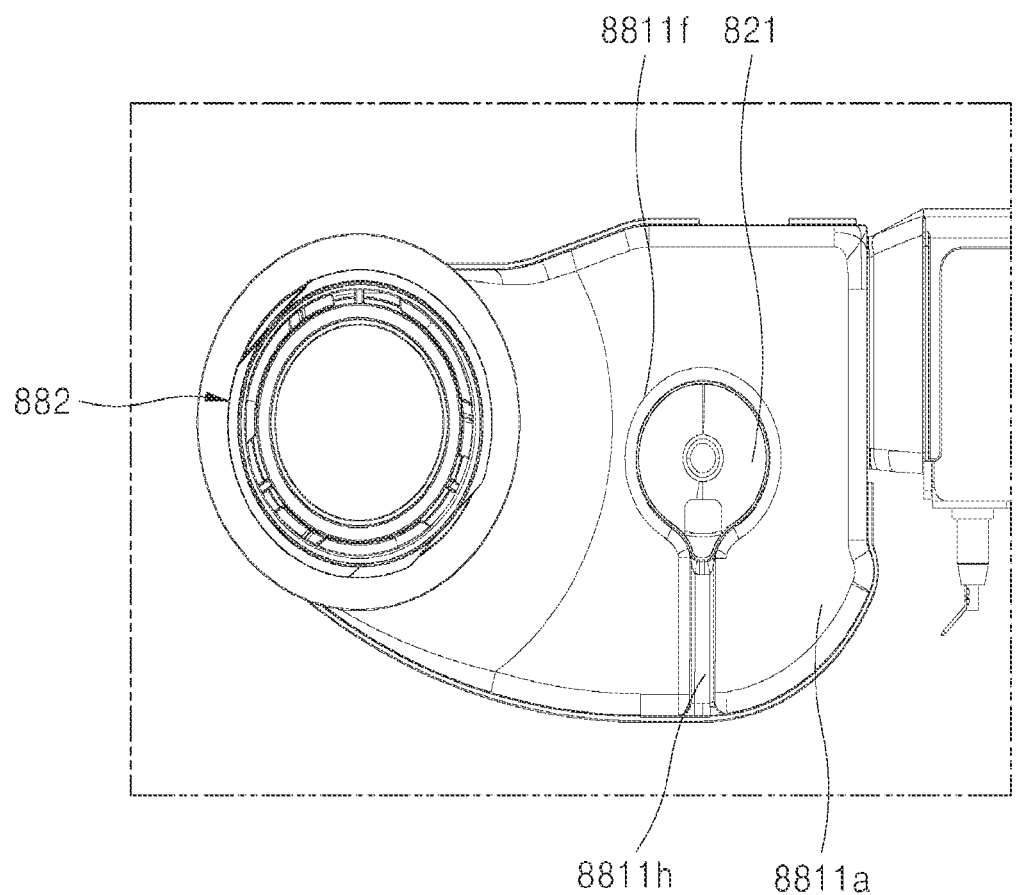
FIG. 17 is a plan view of FIG. 16.

At this time, the drain channel 8811*h*, as illustrated in FIGS. 16 and 17, may extend linearly to the front surface of the first housing 8811, and have a slit shape that is concave downward.

By doing so, wash water having flown into the vent hole 8811*f* and the vent duct 8811*g* may move through the drain channel 8811*h* and be discharged toward the base 90.

The extension of the drain channel 8811*h* to the front surface of the first housing 8811 is to help wash water to be discharge to the leakage detecting part disposed at the front surface side in the lower portion of the filter housing 881 within a minimum distance.

Accordingly, when the leakage detecting part is disposed at the rear surface side of the filter housing 881, the extension direction of the drain channel 8811*h* may change such that the drain channel 8811*h* extends toward the rear surface of the first housing 8811.

The filter housing 881 of the dishwasher of the embodiment may further comprise a blocking rib 8811*i* as a means of blocking and preventing leaking wash water from flowing into the vent hole 8811*f* and the vent duct 8811*g* completely.

Figure 18:
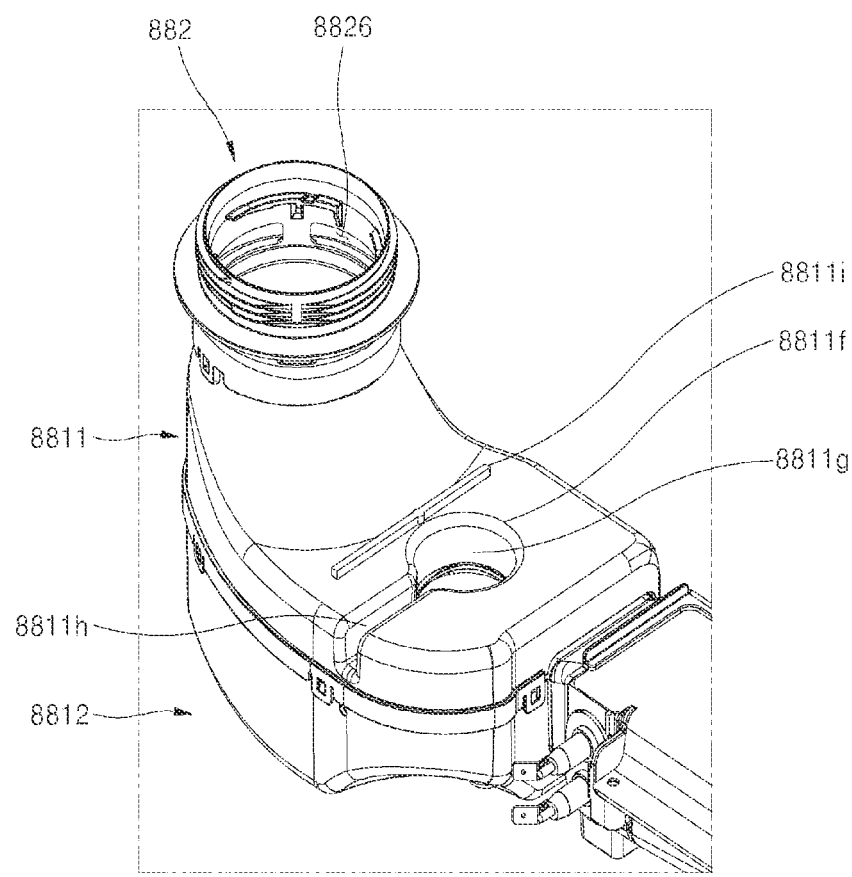
FIG. 18 is a front perspective view showing an embodiment of a blocking added to the configuration of FIG. 16.
Figure 19:
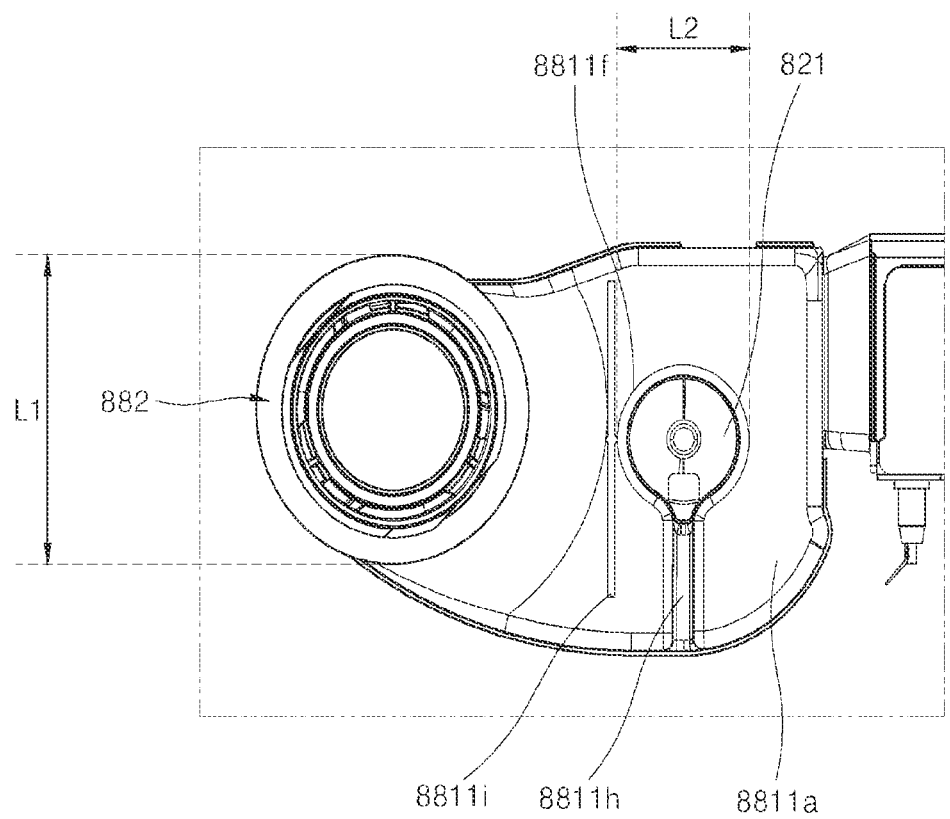
FIG. 19 is a plan view of FIG. 18.

As illustrated in FIGS. 18 and 19, the blocking rib 8811*i* may be disposed between the tub connection duct 882 forming the upper end of the first housing 881 and the vent hole 8811*f* with respect to the horizontal direction, and integrally formed on the upper surface of the first housing 8811 in the form of a barrier that protrudes upward from the upper surface of the first housing 8811.

Accordingly, since the blocking rib 8811*i* protrudes from the upper surface of the first housing 8811, the up-down position of the upper end of the blocking rib 8811*i* may be higher than the up-down position of the upper surface of the first housing 8811 and the up-down position of the vent hole 8811*f*.

At this time, to block wash water moving from the tub connection duct 882 from entering into the vent hole 8811*f*, the blocking rib 8811*i* may extend in a direction across the flow direction of the wash water.

With respect to the flow direction of dry airflow, since the tub connection duct 882 is disposed further upstream than the vent hole 8811*f*, the blocking rib 8811*i* may be disposed further downstream then the tub connection duct 882 and further upstream than the vent hole 8811*f*.

Additionally, with respect to the flow direction of dry airflow, the length L1 of the blocking rib 8811*i* in a direction across the flow direction of the dry airflow may be greater than the thickness and the up-down height of the blocking rib 8811*i* in a direction parallel with the flow direction of the dry airflow.

At this time, the length L1 of the blocking rib 8811*i* may be greater than the diameter L2 of the vent hole 881 if such that the blocking rib 8811*i* may entirely cover the vent hole 8811*f* from above.

Further, in the state where the filter housing 881 is disposed on the base 90, the blocking rib 8811*i* may be disposed on the left of the tub connection duct 882 and on the right of the vent hole 8811*f*, and extend linearly toward the rear surface of the first housing 8811 from the front surface of the first housing 8811.

Specifically, the blocking rib 8811*i* may continuously extend linearly from the front edge of the upper surface of the first housing 8811 to the rear edge thereof.

Furthermore, the height of the upper surface of the blocking rib 8811*i* from the upper surface of the first housing 8811 may remain constant approximately.

As shown in the illustrative embodiment, if the blocking rib 8811*i* is disposed on the upper surface of the fan housing accommodation part 8811*b* of the first housing 8811, which is a flat surface in parallel with the horizontal direction, the up-down position of the upper end of the blocking rib 8811*i* may remain constant in the lengthwise direction of the blocking rib 8811*i*.

On the contrary, if the blocking rib 8811*i* is disposed on the upper surface of the filter accommodation part 8811*a* of the first housing 8811, which is a curved surface the up-down height of which varies depending on positions, the up-down position of the upper end of the blocking rib 8811*i* may change in response to the shape of the upper surface of the filter accommodation part 8811*a*, to maintain the height of the blocking rib 8811*i* from the upper surface of the first housing 8811.

The embodiments are described above with reference to a number of illustrative embodiments thereof. However, embodiments are not limited to the embodiments and drawings set forth herein, and numerous other modifications and embodiments can be drawn by one skilled in the art within the technical scope of the disclosure. Further, the effects and predictable effects based on the configurations in the disclosure are to be included within the scope of the disclosure though not explicitly described in the description of the embodiments.

The invention claimed is:

1. A dishwasher, comprising:
a base;
a tub disposed on the base and configured to accommodate a wash target; and
a dry air supply disposed below the tub and configured to generate dry air for drying the wash target and to supply the dry air into the tub, the dry air supply comprising:
a fan configured to generate a flow of the dry air, and
a filtering part configured to accommodate a filter member that is configured to filter air to be suctioned into the fan, the filtering part defining a plurality of suction openings that are spaced apart from each other in an up-down direction and open toward a space defined between the base and the tub.

2. The dishwasher of claim 1, wherein the filtering part further comprises a filter housing that defines a filter accommodation space configured to accommodate the filter member,
wherein the plurality of suction openings comprise:
an upper suction opening defined at an upper side of the filter accommodation space, and
a lower suction opening defined at a lower side of the filter accommodation space, and
wherein a bottom surface of the filter housing is spaced from a lower surface of the base and defines the lower suction opening.

3. The dishwasher of claim 2, wherein the filter member has a cylinder shape, the filter member having:
an upper opening defined at an upper surface of the filter member and configured to receive air having passed through the upper suction opening, and
a lower opening defined at a lower surface of the filter member and configured to receive air having passed through the lower suction opening.

4. The dishwasher of claim 3, wherein the upper opening of the filter member is open toward a lower surface of the tub, and the lower opening of the filter member is open toward the lower surface of the base.

5. The dishwasher of claim 4, wherein the filter member includes:
an inner surface configured to receive the air through the upper opening and the lower opening of the filter member; and
an outer surface configured to discharge filtered air passed through the inner surface and the outer surface of the filter member.

6. The dishwasher of claim 5, wherein the fan is connected to the filter housing, the fan defining an intake opening that is open toward an inner surface of the filter housing and configured to suction the filtered air discharged from the outer surface of the filter member.

7. The dishwasher of claim 3, wherein the upper suction opening is defined at a position higher than the upper opening of the filter member in the up-down direction, and
wherein the lower suction opening is defined at a position lower than the lower opening of the filter member in the up-down direction.

8. The dishwasher of claim 7, wherein an open surface area of the lower suction opening is less than an open surface area of the lower opening of the filter member.

9. The dishwasher of claim 8, wherein a diameter of the lower suction opening is less than an inner diameter of the lower opening of the filter member.

10. The dishwasher of claim 8, wherein the lower suction opening faces the lower opening of the filter member in the up-down direction and defines an area overlapping with the lower opening of the filter member along the up-down direction.

11. The dishwasher of claim 8, wherein the bottom surface of the filter housing is configured to contact the lower surface of the filter member.

12. The dishwasher of claim 8, wherein the filtering part further comprises a first rib that is disposed at the bottom surface of the filter housing, and
wherein the first rib protrudes upward and is configured to insert into the filter member through the lower opening of the filter member.

13. The dishwasher of claim 12, wherein the first rib is configured to contact an inner circumferential surface of the filter member.

14. The dishwasher of claim 13, wherein the filtering part further comprises a second rib that is disposed at the bottom surface of the filter housing and extends from a circumference of the lower suction opening, and
wherein the second rib protrudes upward and is configured to contact an outer circumferential surface of the filter member in the filter accommodation space.

15. The dishwasher of claim 7, wherein the upper suction opening is defined between the tub and the upper surface of the filter member in the up-down direction.

16. The dishwasher of claim 15, wherein the tub defines a filter replacement hole at a lower surface thereof,
wherein the filter housing comprises a tub connection duct that defines the upper suction opening and the tub connection duct having an upper end that protrudes upward and passes through the filter replacement hole, and
wherein the upper suction opening passes through a circumferential surface of the tub connection duct and is open horizontally.

17. The dishwasher of claim 16, wherein the upper suction opening comprises a plurality of penetration openings that are arranged along a circumferential direction of the tub connection duct.

18. The dishwasher of claim 16, wherein the filter housing comprises a protruding surface that protrudes from an inner surface of the filter housing toward the filter accommodation space, the protruding surface being disposed below the upper suction opening in the up-down direction.

19. The dishwasher of claim 18, wherein the protruding surface extends along a circumferential direction of an outer circumferential surface of the filter member, and
   wherein the protruding surface is configured to contact the outer circumferential surface of the filter member in the filter accommodation space.

20. The dishwasher of claim 19, wherein the protruding surface defines a cylindrical shape, and an inner circumferential surface of the protruding surface is configured to contact the outer circumferential surface of the filter member.

\* \* \* \* \*